(12) United States Patent
McCormick

(10) Patent No.: US 12,072,223 B2
(45) Date of Patent: *Aug. 27, 2024

(54) THROUGH THE WALL TANK LEVEL MEASUREMENT WITH TELEMETRY AND MILLIMETER WAVE RADAR

(71) Applicant: Lasso Technologies, LLC, Dallas, TX (US)

(72) Inventor: Peter E. McCormick, Dallas, TX (US)

(73) Assignee: Lasso Technologies, LLC, Dallas, TX (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/588,176

(22) Filed: Jan. 28, 2022

(65) Prior Publication Data

US 2022/0221322 A1 Jul. 14, 2022

Related U.S. Application Data

(63) Continuation-in-part of application No. 16/382,019, filed on Apr. 11, 2019, now Pat. No. 11,555,732.

(60) Provisional application No. 63/142,890, filed on Jan. 28, 2021, provisional application No. 62/691,139, (Continued)

(51) Int. Cl.
| | | |
|---|---|---|
| *G01F 23/284* | (2006.01) | |
| *G01S 7/00* | (2006.01) | |
| *G01S 7/35* | (2006.01) | |
| *G01S 13/34* | (2006.01) | |
| *H01Q 15/08* | (2006.01) | |

| | | |
|---|---|---|
| *H04W 4/38* | (2018.01) | |
| *G01S 13/88* | (2006.01) | |

(52) U.S. Cl.
CPC .......... *G01F 23/284* (2013.01); *G01S 7/003* (2013.01); *G01S 7/35* (2013.01); *G01S 13/34* (2013.01); *H01Q 15/08* (2013.01); *H04W 4/38* (2018.02); *G01S 13/888* (2013.01)

(58) Field of Classification Search
CPC .......... G01F 23/284; G01S 7/003; G01S 7/35; G01S 13/34; G01S 13/888; H01Q 15/08
See application file for complete search history.

(56) References Cited

U.S. PATENT DOCUMENTS 5,440,310 A * 8/1995 Schreiner .............. G01S 13/343
73/290 R
5,900,546 A * 5/1999 Wilkins .............. G01F 23/2962
73/290 V (Continued)

*Primary Examiner* — Marcus E Windrich
(74) *Attorney, Agent, or Firm* — Locke Lord LLP

(57) ABSTRACT

Methods and systems for determining fluid levels in a tank comprise a mmWave control unit configured to generate and transmit a millimeter wave chirp. The control unit transmits the chirp into the tank through a Luneburg lens and receives one or more chirp reflections from the tank. For each tank level reading, three or more chirp configuration profiles are used in order to ensure accurate depth measurements due to multi-path reflections in most tanks. The control unit mixes the chirps with the chirp reflections to generate a set of responses for each chirp configuration profile. The responses are compared and the two best responses are selected and averaged. The set of averaged responses are then processed using a ballot and vote process to determine the distance reading that is likely to provide the most accurate tank level.

20 Claims, 34 Drawing Sheets

Related U.S. Application Data filed on Jun. 28, 2018, provisional application No. 62/656,032, filed on Apr. 11, 2018.

(56) References Cited

U.S. PATENT DOCUMENTS

| | | | | |
|---|---|---|---|---|
| 6,107,957 | A * | 8/2000 | Cramer | G01S 7/354 |
| | | | | 342/124 |
| 7,114,390 | B2 * | 10/2006 | Lizon | G01F 23/2966 |
| | | | | 73/290 R |
| 7,542,866 | B1 * | 6/2009 | Lovegren | G01F 23/284 |
| | | | | 702/50 |
| 2002/0101373 | A1 * | 8/2002 | Arndt | G01S 15/584 |
| | | | | 342/52 |
| 2004/0099815 | A1 * | 5/2004 | Sfez | A61B 5/0073 |
| | | | | 250/492.1 |
| 2004/0263418 | A1 * | 12/2004 | Kuroda | H01Q 15/08 |
| | | | | 343/909 |
| 2008/0236275 | A1 * | 10/2008 | Breed | H01Q 1/225 |
| | | | | 73/290 V |
| 2011/0181458 | A1 * | 7/2011 | Feil | G01S 7/4056 |
| | | | | 342/124 |
| 2017/0008251 | A1 * | 1/2017 | Pruett | B32B 5/18 |
| 2021/0359758 | A1 * | 11/2021 | Mizunuma | H04B 7/15507 |
| 2021/0403711 | A1 * | 12/2021 | Buzinkai | C08K 7/14 |
| 2021/0403713 | A1 * | 12/2021 | Buzinkai | H01Q 1/421 |
| 2021/0407736 | A1 * | 12/2021 | Lanagan | H01B 3/10 |

\* cited by examiner

1302

1: "profileCfg 0 77 7 7 114.4 20 0 33.71 1 512 5000 0 0 24"
"frameCfg 0 0 64 0 1300 1 0"
2: "profileCfg 0 77 7 3 132 20 0 30 1 512 4000 0 0 24"        ← 1304
"frameCfg 0 0 64 0 1300 1 0"
3: "profileCfg 0 77 100 20 160 20 0 23 1 512 3800 0 0 24"
"frameCfg 0 0 64 0 1000 1 0"
N: . . .

-frequency start (GHz)
-idle time (uS)
-ADC start time (uS)                                           ← 1303
-Ramp end time (uS )
-Tx out power backupoff
-TxPhaseShifter TX antenna
-Frequency slope chirp
-Tx Start (uS)
-numAdcSampes collected ADC sample time
-digOutSampleRate ADC sampling frequency
-High pass filter 1 index
-High pass filter 2 index
-RxGain 24 to 48
-number of loops
-frame periodicity (ms)

FIG. 13B

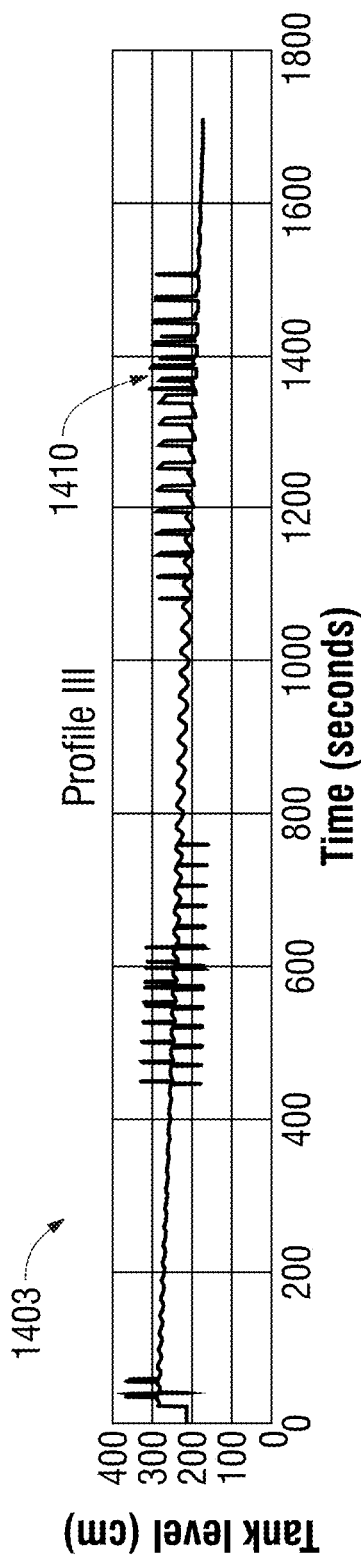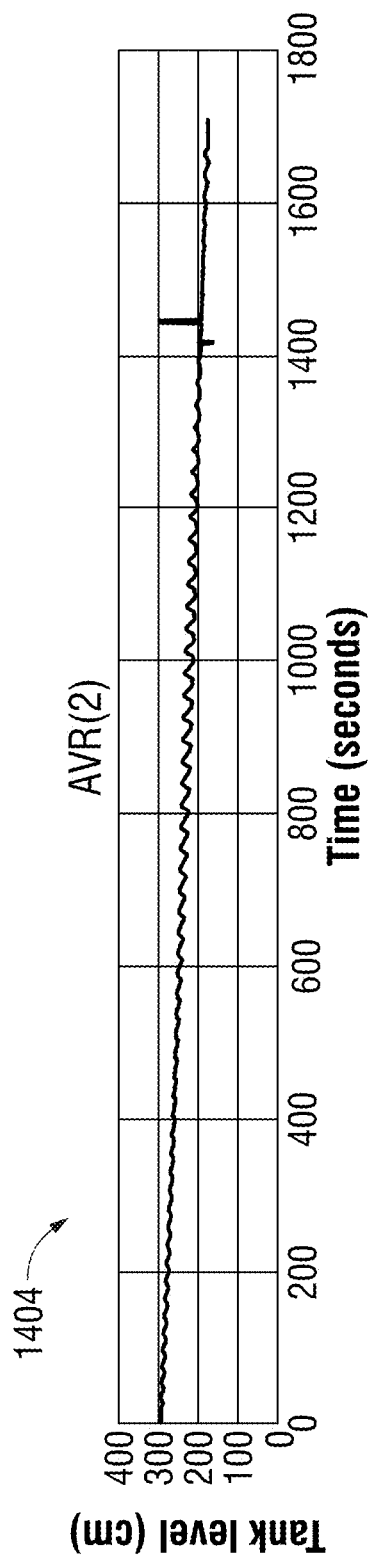

1501

| | |
|---|---|
| Lasso.com v120120 | Boot up screen with software version. |
| PING: 16.8" 140% | Ping is distance to fluid of 16.8 inches and signal strength in %. |
| 22.3" DEPTH | Depth of fluid is 55.0". Big Font. Depth = Distance to Bottom - Ping |
| 243.1 GAL | Gallons of fluid in the tank. Gallons=Depth * Gallons/inch. Big Font. |
| TRANSMIT TIMES 120s 250s | Satellite just transmitted. 1 of 3. Next transmission is in 120 sec and last one is 250s. |
| PREP GPS 340 min OK | Configuration of GPS interval successful. |
| Send Config OK | Configuration of Satellite modem successful. |
| 72.1F 6.2V | Internal Temperature and Battery V. Replace battery if less than 5.3V. |
| Bursts=3 15 to 110 sec | 3 random interval satellite transmissions will be sent occurring between 15 to 110 sec. |
| Abort Tx OK | Abort possible pending transmissions before trying to send data. |
| Send Data OK | Message that data was correctly sent to satellite modem. |
| Sleep 27 min | Message that Alpha will now sleep for 27 minutes before waking and sending another message. |

1502

| | ERRORS |
|---|---|
| TURBULENCE | Turbulence in tank if distance changes more than 2 inches in 3 seconds. Remove turbulence. |
| RADAR NOT CONNECTED | No radar sensor is detected. Check battery voltage. |
| NO SIGNAL ADJUST RADAR ANGLE | Radar enclosure should be parallel to the fluid for strong reflection. Adjust angle of the Radar box. |
| NO SIGNAL MOVE RADAR | Radar could not lock onto a good level. Try another location on your tank. |

FIG. 15 iRadar Remote Display
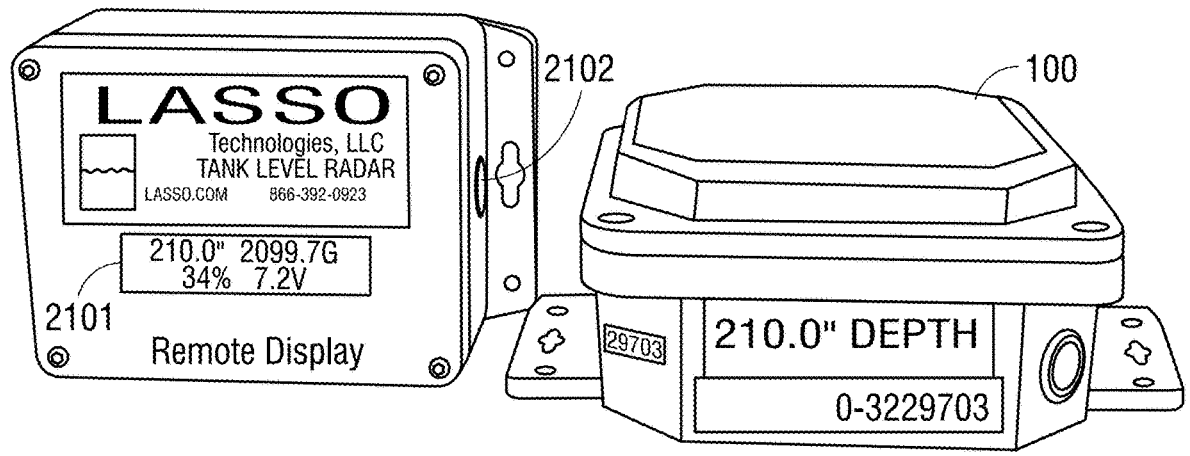
FIG. 21A
iRadar iPhone Interface
Info is shown after selecting Lasso on iPhone.
You can choose from any of your iRadars.
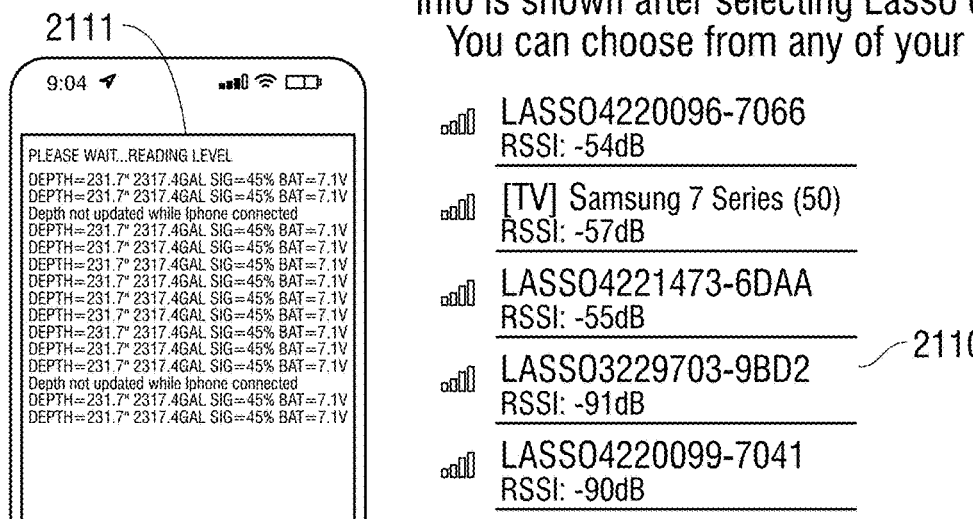
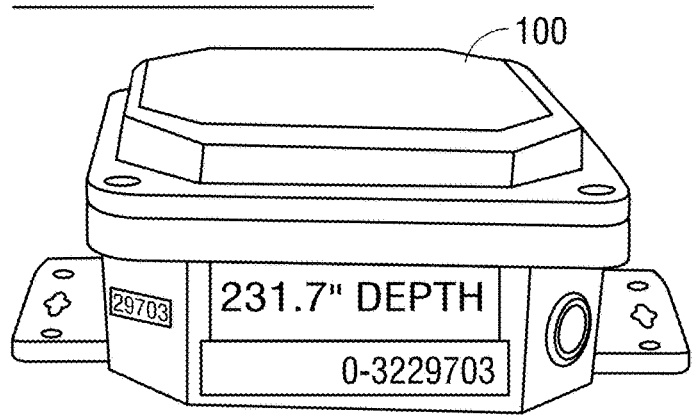
FIG. 21B

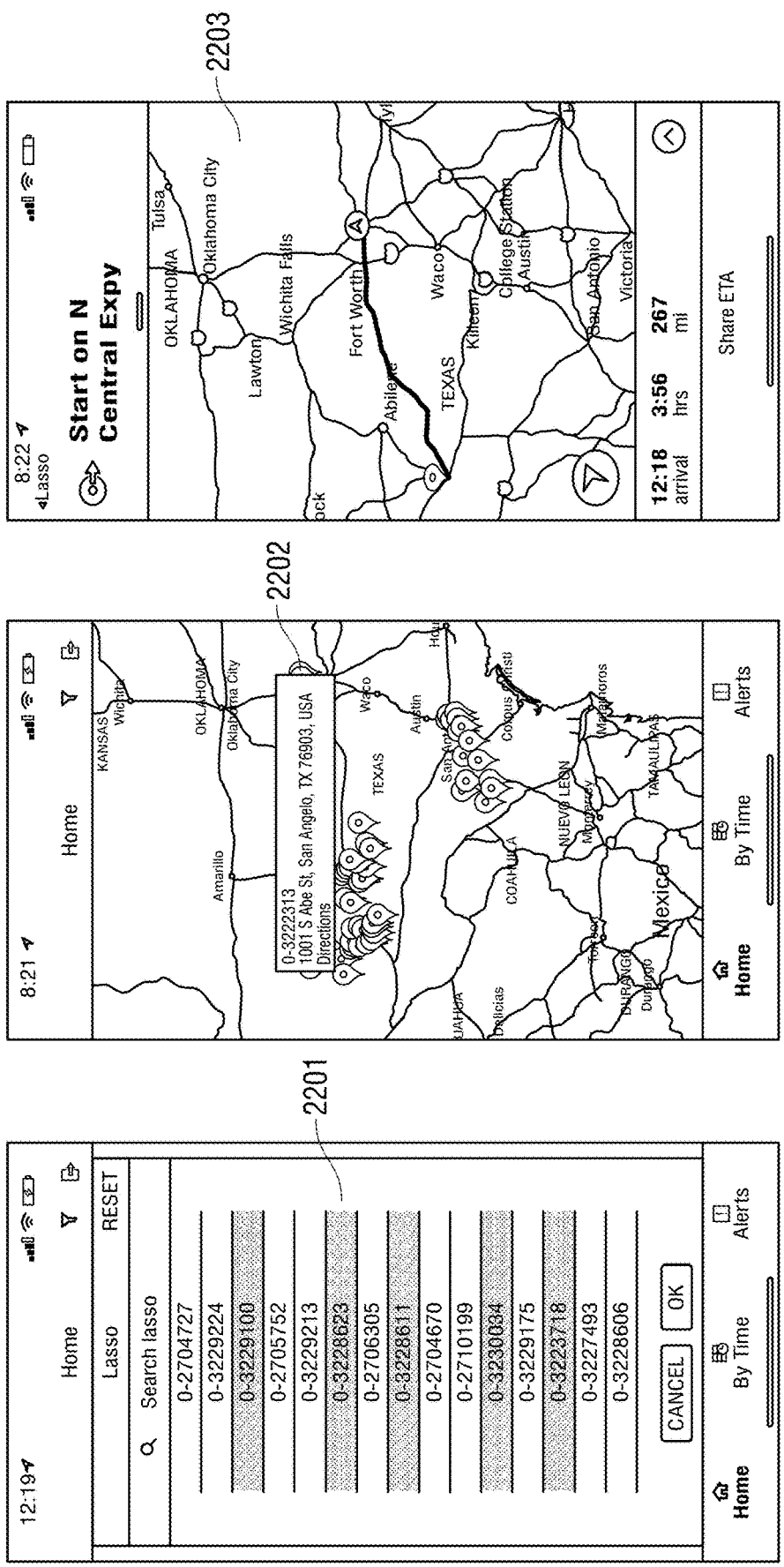

| SET | | REQUEST | 2602 |
|---|---|---|---|
| | 2601 | | |
| D48.3 | * Set Depth to 48.3 inches after measuring using ruler. | D? | Request current depth. |
| BO120.6 | * Distance to bottom of tank is 120.6 inches. | BO? | Request current distance to bottom. |
| I1.2 | * Ignore top 1.2 inches when measuring. | I? | Request current ignore distance. |
| GPI10.2 | Set gallons per inch when a rectangular tank. | GPI? | Request current GAl/inch. |
| GPS360 | Send GPS every 360 minute or 6 hours. | GPS? | Request current GPS update minutes. |
| GMT5 | Set internal clock time to current GMT-5 hours. | GMT? | Request GMT offset. |
| R5 | Current radar on time is 5 seconds. Not advisable to adjust. | R? | Request current ontime. |
| T0 | Tank lookup table. 1=Rectangular tank. See lookup table. | T? | Request tank used. |
| W,7,19,23 | Wake and send level at 7am, 7pm, and 11pm. 24 hour clock. | W? | Request times to send data. |
| H | Display help cheat sheet list of iPhone commands above. | H? | Request as H. |
| | | S? | Request best current signal strength. |
| | | GA? | Request current gallons. |
| MID90 | Middle tank threshold is 90%. | MID? | Request middle of tank threshold. |
| BT50 | Bottom threshold when near bottom of tank is 50%. | BT? | Request bottom of tank threshold. |
| AMP50 | Amplification of radar %. Only use 20,40,60,80,100%. | AMP? | Request amplifier setting. |
| MIN6 | Minimum empty tank threshold is 6%. Empty tank if all echos <6%. | MIN? | Request minimum threshold. |

| TANK LOOKUP FOR T COMMAND ABOVE (T5 would be Tiger 500BBL) | | | | | |
|---|---|---|---|---|---|
| 1 Gallons per inch linear tank | 6 TIGER 500G TOTE | 11 OEG 300BBL CARGO | 16 SWIRE 500BBL | 21 HELIOS 1000G | |
| 2 PRECISION 42x48 IBC | 7 SELECT 1000G | 12 OEG 500BBL CARGO | 17 SWIRE 50BBL STAINLESS | 22 WC WELDING | |
| 3 PRECISION 42x42 IBC | 8 OEG 250G TOTE | 13 OEG 500BBL FRAC | 18 SWIRE 25BBL STAINLESS | | |
| 4 TIGER 25BBL TRANSPORT | 9 OEG 550G TOTE | 14 SWIRE TRC8 | 19 BAKER HOYER | | |
| 5 TIGER 500BBL TRANSPORT | 10 OEG 25BBL IM101 | 15 SWIRE HELIFUEL | 20 HELIOS 300G | | |

THROUGH THE WALL TANK LEVEL MEASUREMENT WITH TELEMETRY AND MILLIMETER WAVE RADAR

CROSS-REFERENCE TO RELATED APPLICATIONS

This application for patent claims the benefit of priority to U.S. Provisional Application No. 63/142,890, entitled "Through the Wall Tank Level Measurement with Telemetry and Millimeter Wave Radar," filed Jan. 28, 2021, and is a continuation-in-part of U.S. Non-Provisional application Ser. No. 16/382,019, entitled "Tank Multi-Level Measurement Using through the Air Millimeter Wave Radar," filed Apr. 11, 2019, which claims the benefit of priority to U.S. Provisional Application No. 62/656,032, entitled "Tank Multi-Level Measurement Using Through the Air Millimeter Wave Radar," filed Apr. 11, 2018, and U.S. Provisional Application No. 62/691,139, entitled "Tank Multi-Level Measurement Using Through the Air Millimeter Wave Radar," filed Jun. 28, 2018, all of which are incorporated herein by reference.

TECHNICAL FIELD

Embodiments of the invention relate generally to the use of radar to measure levels of fluids and other materials in a storage tank and, more specifically, to a self-contained, easy to install, tank level monitor with integrated display, keypad, radar, GPS, and cellular and satellite transmission capabilities for sending the data off-site for further analysis.

BACKGROUND

Storage tanks are used to store many types of liquids, such as oil, water, liquid fuels, liquid chemicals, and the like. It is important in many applications to be able to accurately measure the level of such fluids in a storage tank, for example, to detect loss due to leakage and/or theft, for automatic customer billing based on usage, and also to ensure a sufficient quantity of such fluids is available. From the fluid level, the volume of fluid in the tank can be determined using techniques known in the art (e.g., tank area times fluid level for a circular tank). Measuring a storage tank's fluid levels typically requires matching the liquid being stored with a particular sensing technology in order to accurately determine fluid level. Chemical attributes, viscosity, pressure, temperature, environment, cost constraints, power-on time, power requirements, accuracy requirements, and other considerations may dictate what type of sensor can be used for a given liquid. This is made even more difficult when the tank contains multiple types of fluids with different attributes.

Tank fluid levels are typically read using a mechanical float on a magneto restrictive rod, or using ultrasonics, hydrostatic pressure, guided wave radar and pulse radar. These sensors report data to a remote telemetry modem where the data is sent, for example, to a web site or other end user. However, creating a narrow beam width with limited power to pass FCC requirements and still accurately measure tank levels remains a challenge.

Accordingly, advancements are continually needed in the art of measuring storage tank levels.

SUMMARY OF THE DISCLOSED EMBODIMENTS

Embodiments of the invention relate to a fluid level monitor that use a millimeter wave (mmWave) radar system to measure levels of fluids and other materials in a storage tank. The mmWave radar system emits a chirp signal that reflects off objects and fluids and a return signal that is received by a receiving antenna. The received signal is mixed with the outgoing signal to generate a signal having an intermediate frequency which is directly proportional to the distance to one or more levels of fluid in the tank or obstructions. The fluid level monitor filters out signals resulting from extraneous obstructions and false signals by ignoring some resulting distances and lower power signals to determine the desired distance.

Advanced algorithms and filters are used to better determine the true tank level resulting from the monitor's operation. Once accurately determined, the tank levels and volume are displayed locally to the user on a display. In addition, wireless telemetry is used to send the resulting tank levels to remote web sites where further GPS location, charts, graphs, Key Performance Indicators, alerts, auto billing, emails, and text messages can be generated for the end users. In addition to the data being available on the web, Bluetooth is used to transmit data to a local display or smartphone. A smartphone can be used to wake and remotely read any tank's attributes and even program and configure the tank monitor. The tank monitor is adaptable to plastic tanks but can also be installed on metal tanks using an adapter. Since the monitor is totally enclosed, there is no contact with the fluid and the radar based monitor works on virtually any kind of chemical.

In general, in one aspect, embodiments of the present disclosure relate to a tank level monitor for measuring a distance from near a top of a tank to one or more fluids in the tank. The tank level monitor comprises, among other things, a chirp generator operable to generate a millimeter wave chirp that ramps linearly from a starting frequency to a predefined higher frequency within a specified time span. The tank level monitor also comprises an antenna and quadrature hybrid circuit configured to transmit the chirp generated by the chirp generator into the tank and to receive one or more chirp reflections from the tank. The tank level monitor further comprises a Luneburg lens coupled to the antenna and quadrature hybrid circuit, the antenna and quadrature hybrid circuit configured to transmit the chirp and receive the chirp reflections through the Luneburg lens. The tank level monitor still further comprises a mixer operable to mix the chirp with the chirp reflections to generate one or more intermediate frequency signals, and a processor operable to process the one or more intermediate frequency signals and derive signal strengths and distances from the one or more intermediate frequency signals, each distance indicative of the distance from near a top of the tank to one of the one or more fluids in the tank or an obstruction in the tank. The tank level monitor yet further comprises a controller operable to automatically select intermediate frequency signals having signal strengths above a predefined minimum or distances within a predefined distance window for further processing and ignore other intermediate frequency signals and distances.

In some embodiments, the controller is programmed to automatically select an intermediate frequency signal for further processing, the intermediate frequency signal representing the best returned signal for further processing.

In some embodiments, the controller is programmed to automatically further process the selected intermediate frequency signal by adding the selected intermediate frequency signal to a ballot, the ballot including previously selected intermediate frequency signals, the controller further programmed to automatically vote on the intermediate frequency signals on the ballot.

In some embodiments, the controller is programmed to automatically use distance windows to ignore distances indicative of obstructions in the tank.

In some embodiments, the controller is programmed to automatically focus on specific distance windows indicative of fluids in the tank.

In some embodiments, the processor is operable to process the one or more intermediate frequency signals using zoom Fourier transform.

In some embodiments, the tank level monitor further comprises a telemetry unit operable to transmit distance readings to an off-site location. In some embodiments, the telemetry unit is configured to use one of the following wireless telemetry technologies: cellular, satellite, Bluetooth, Wi-Fi, Z-Wave, ZigBee, WiMax, Sigbox, LoRa, Ingenu.

In some embodiments, the chirp generator generates a chirp according to a preselected chirp configuration profile, and wherein the chirp generator is operable to use three chirp profiles for a given tank level and volume reading.

In some embodiments, the tank level monitor further comprises a wake button that allows a user to wake the tank level monitor, the tank level monitor configured to obtain a tank level and volume reading and to present the reading upon being woken.

In some embodiments, the tank level monitor automatically wakes as needed to obtain a GPS location, obtain a tank level reading, and send data representing the GPS location and the tank level reading wirelessly to an off-site location.

In some embodiments, the controller is operable to wake upon receiving a wake command from a smartphone or a remote display via Bluetooth, obtain a tank level reading, and send data representing the tank level reading wirelessly to an off-site location.

In some embodiments, the chirp generator generates more than 30 chirps per frame sample.

In some embodiments, the processor is further operable to apply one or more of the following filters to the intermediate frequency signals: OS-CFAR filter, and Blackman filter.

In some embodiments, the controller is further operable to transmit tank level and volume readings to an external display using Bluetooth.

In some embodiments, the controller is further operable to transmit tank level and volume readings to a smartphone using Bluetooth In some embodiments, the controller is further operable to receive commands and tank parameters from a smartphone via Bluetooth. In some embodiments, the tank level monitor can receive a tank template from the smartphone, the tank template containing setup and configuration parameters for a specific type of tank.

In some embodiments, the controller is further operable to wake up upon receiving a wake-up sequence from a smartphone over Bluetooth, the wake up sequence initiated on the smartphone by a user touching any monitor serial number via a smartphone app running thereon, the controller further operable to obtain and send tank level and other tank data to the user via the smartphone.

In general, in another aspect, embodiments of the present disclosure relate to a method of monitoring tank level for measuring a distance from near a top of a tank to one or more fluids in the tank. The method comprises, among other things, generating, at a chirp generator, a millimeter wave chirp that ramps linearly from a starting frequency to a predefined higher frequency within a specified time span, and transmitting, through a quadrature hybrid circuit to an antenna, then through a Luneburg lens, the chirp generated by the chirp generator into the tank. The method also comprises receiving, through the Luneburg lens coupled to the antenna and through the quadrature hybrid circuit, one or more chirp reflections from the tank, and mixing, at a mixer, the chirp with the chirp reflections to generate one or more intermediate frequency signals. The method further comprises processing, at a processor, the one or more intermediate frequency signals and derive strengths and distances from the one or more intermediate frequency signals, each distance indicative of a distance from near a top of the tank to one of the one or more fluids in the tank or an obstruction in the tank. The method still further comprises automatically selecting, at a controller, intermediate frequency signals having signal strengths above a predefined minimum or distances within a predefined distance window for further processing and ignoring other intermediate frequency signals and distances.

BRIEF DESCRIPTION OF THE DRAWINGS

The foregoing and other advantages of the disclosed embodiments will become apparent upon reading the following detailed description and upon reference to the drawings, wherein:

FIGS. 13A-13B show exemplary chirp profiles for an exemplary tank level monitor according to an embodiment of this disclosure;

FIGS. 14A-14D are graphs of exemplary chirp profiles for an exemplary tank level monitor according to an embodiment of this disclosure;

FIG. 15 shows exemplary status and error messages for an exemplary tank level monitor according to an embodiment of this disclosure;

FIGS. 21A-21B show a remote display and an iPhone display for an exemplary tank level monitor according to an embodiment of this disclosure;

FIGS. 22A-22C are exemplary smartphone screens for tracking the location of an exemplary tank level monitor according to an embodiment of this disclosure;

FIG. 26 show exemplary requests that can be made via a smartphone app to an exemplary tank level monitor according to an embodiment of this disclosure.

DETAILED DESCRIPTION OF PREFERRED EMBODIMENTS

Figure 1:
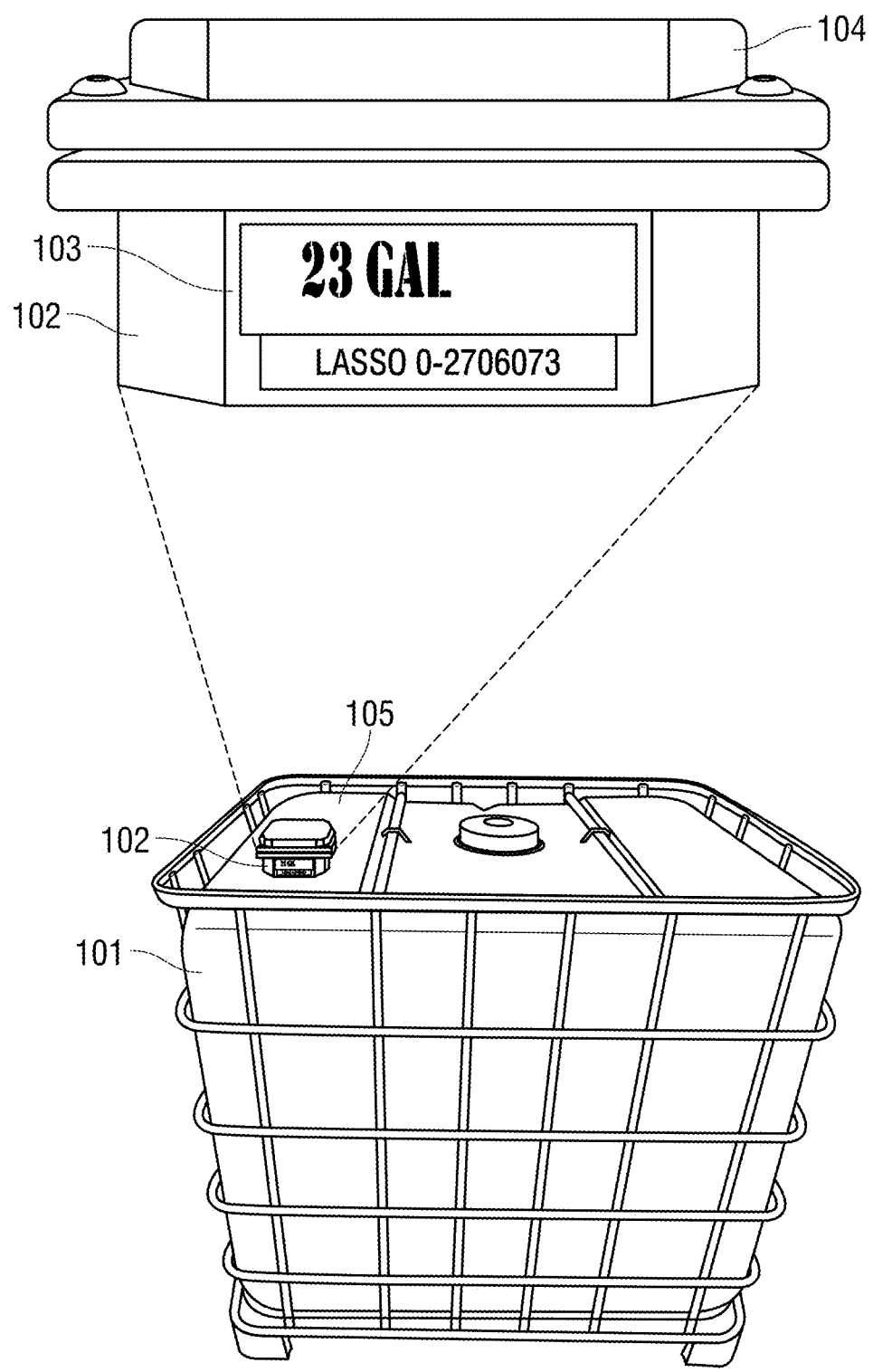
FIG. 1 is an external view showing an exemplary tank level monitor according to an embodiment of this disclosure.

As an initial matter, it will be appreciated that the development of an actual, real commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

Embodiments of the fluid level monitor herein employ a single-chip sensor having mmWave measurement capability, such as one of the family of mmWave sensors from Texas Instruments (TI). The sensor preferably uses Frequency-Modulated Continuous Wave (FMCW) radar operating in the 76-81 GHz band with a 4 GHz chirp. An ARM processor is used for the receivers to control and calibrate the signals. A built-in Digital Signal Processor (DSP) is used to perform radar math and run Fast Fourier transforms, such as Zoom Fast Fourier transform, on the signals to directly determine distances to fluids. One or more embodiments use a single receive and transmit antenna and a Luneburg lens configuration to focus the radar beam. Radar circuits such as the TI mmWave family of integrated circuits provide compact methods of processing the necessary signals to determine distance.

The variations among the TI mmWave family (AWR1443, AWR1642, IWR1642, IW1843) have different attributes depending upon needs, but the technology used is the same. One or more embodiments use the IWR1642 or AWR1642 sensors from TI. The "A" indicates automotive use, typically for driverless cars, and the "I" indicates industrial use, but the functionality is otherwise identical. Examples of fluid level monitors that use one of the AWR1642 sensors in a manner similar to the embodiments described herein are available from Lasso Technologies LLC, of Dallas, Texas.

Referring now to FIG. 1, a tank level monitor is shown generally at 100 according to some embodiments. The tank level monitor 100 is designed to use a mmWave radar that meets FCC requirements. By way of context, any RF power transmitted in the United States requires FCC approval and licenses. Different sections of the FCC code must be passed to be legally used for a particular application and frequency. The main section dealing with the use of radar on storage tanks is FCC 15.256 Level Probing Radar 75-85 GHz. The key FCC 15.256 requirements are set out below.

Fundamental emission limits EIRP 1 MHz and 50 MHz bandwidth

On tank, pointing down

Stationary use

Peak EIRP (Equivalent Isotropic Radiated Power) 34 dBm

Azimuth beam width −3 dB beam width<8 degrees

Antenna side lobe gain relative to main beam −38 dB

The tank level monitor 100 disclosed herein can pass the above FCC 15.256 requirements. In addition, the tank level monitor 100 can be used on smaller tanks 101, such as IBC (Intermediate Bulk Containers), as well as on virtually any plastic tank or metal tank when an adapter is used. The tank level monitor 100 has an advantage of very fast and easy installation, such as by using tape or adhesive between the radar 102 and the plastic tank wall 105. No holes need to be drilled in the tank and embodiments of the tank level monitor 100 can be installed in a few minutes. The customer can screw or strap the enclosure to the tank if preferred over 3M tape.

Embodiments of the tank level monitor 100 can be placed almost anywhere on top of the tank 101. Packaging the tank level monitor 100 in an appropriate plastic enclosure allows the tank level monitor 100 to be used through the access ports on larger metal tanks, such as an ISO tank. In contrast, alternative technologies require that a sensor be installed through the tank wall, which has the disadvantage of needing modifications to the tank, thus risking damage, direct contact with the fluid, increased installation time, and potential sensor cleaning issues. The tank level monitor 100 is also low profile so that the tanks can be stacked using a forklift, which is not practical with other tank level measurement methods with higher profile. Display 103 allows the user to see level and volume in the tank. Embodiments of the tank level monitor 100 is fully self-contained with integrated measurement, power, display, and telemetry with no external antennas, for a clean, easy to install superior solution.

Figure 2:
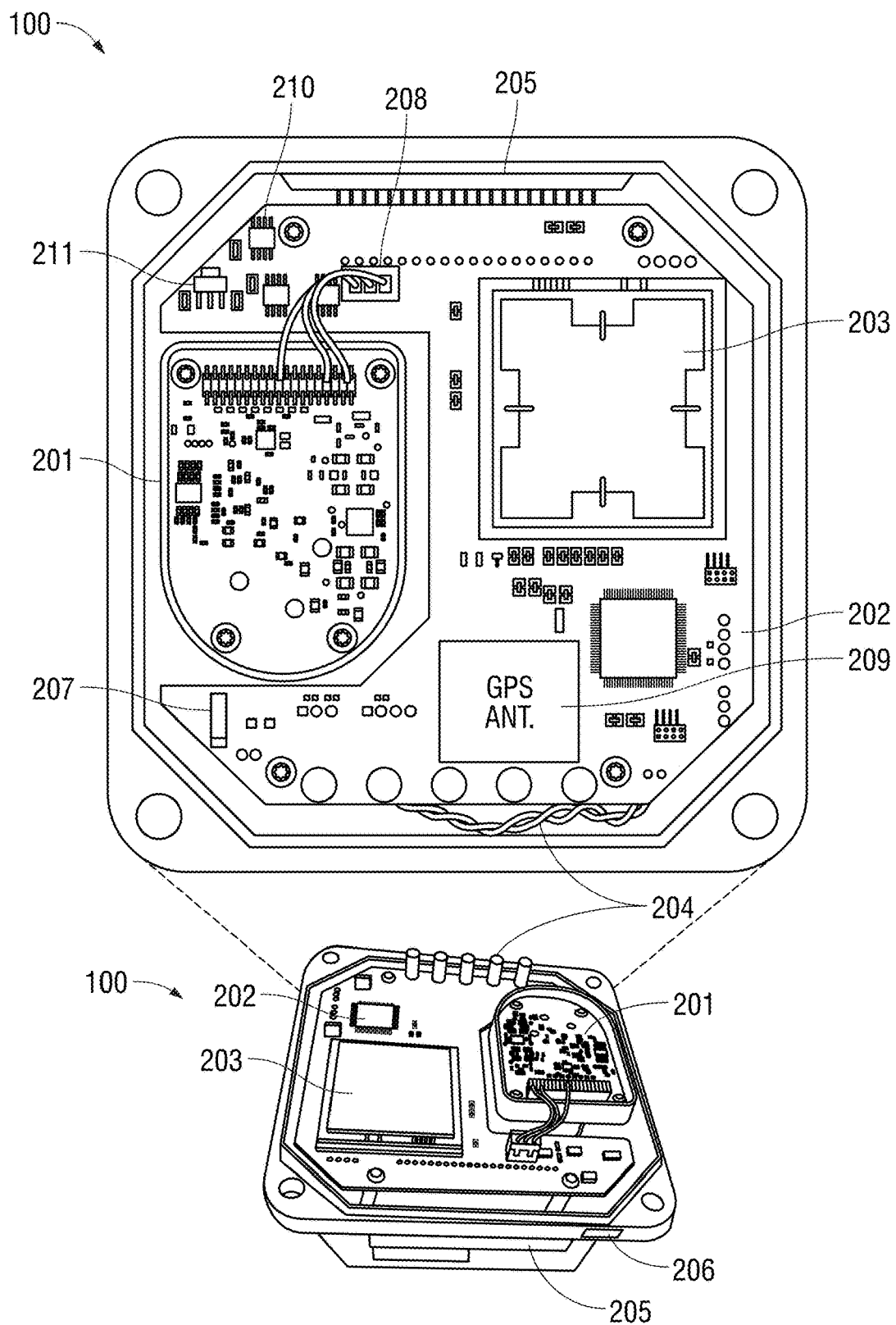
FIG. 2 is an interior view of an exemplary a tank level monitor according to an embodiment of this disclosure.

FIG. 2 shows the tank level monitor 100 with the top cover removed. As can be seen, the tank level monitor 100 is comprised of a main control board 202, on which a controller resides that controls a display, programming keys, telemetry, and transmission and reception of radar to read tank levels. Housing 201 contains the radar board and lens which is connected to the main control board 202 through a power and signal cable 208. Display 205 provides the user with system status, programmability, errors, level, and number of gallons. Power section 210 provides power to different sections of the control board 202 as needed. Programming buttons 204 allow the adjustment of many radar and telemetry parameters. On/Off switch 207 or magnetic switch 211 can be used to turn the tank level monitor 100 on using an external magnet to wake main control board 202. Pushbutton 206 allows a user to wake the tank level monitor 100 anytime to take a radar tank reading and display number of gallons and depth on display 205 so the user can know the tank level. Main control board 202 supervises the coordination of the various components of the tank level monitor 100. Satellite modem 203 sends data off-site, for example, to web sites where further data analysis is performed and data is conveyed to remote users. In place of satellite modem 203, a cellular modem can be used, or any wireless communication method to send the data. GPS antenna 209 is used to provide location data so that the location of the tank level monitor 100 can be embedded with the tank level information.

Figure 3:
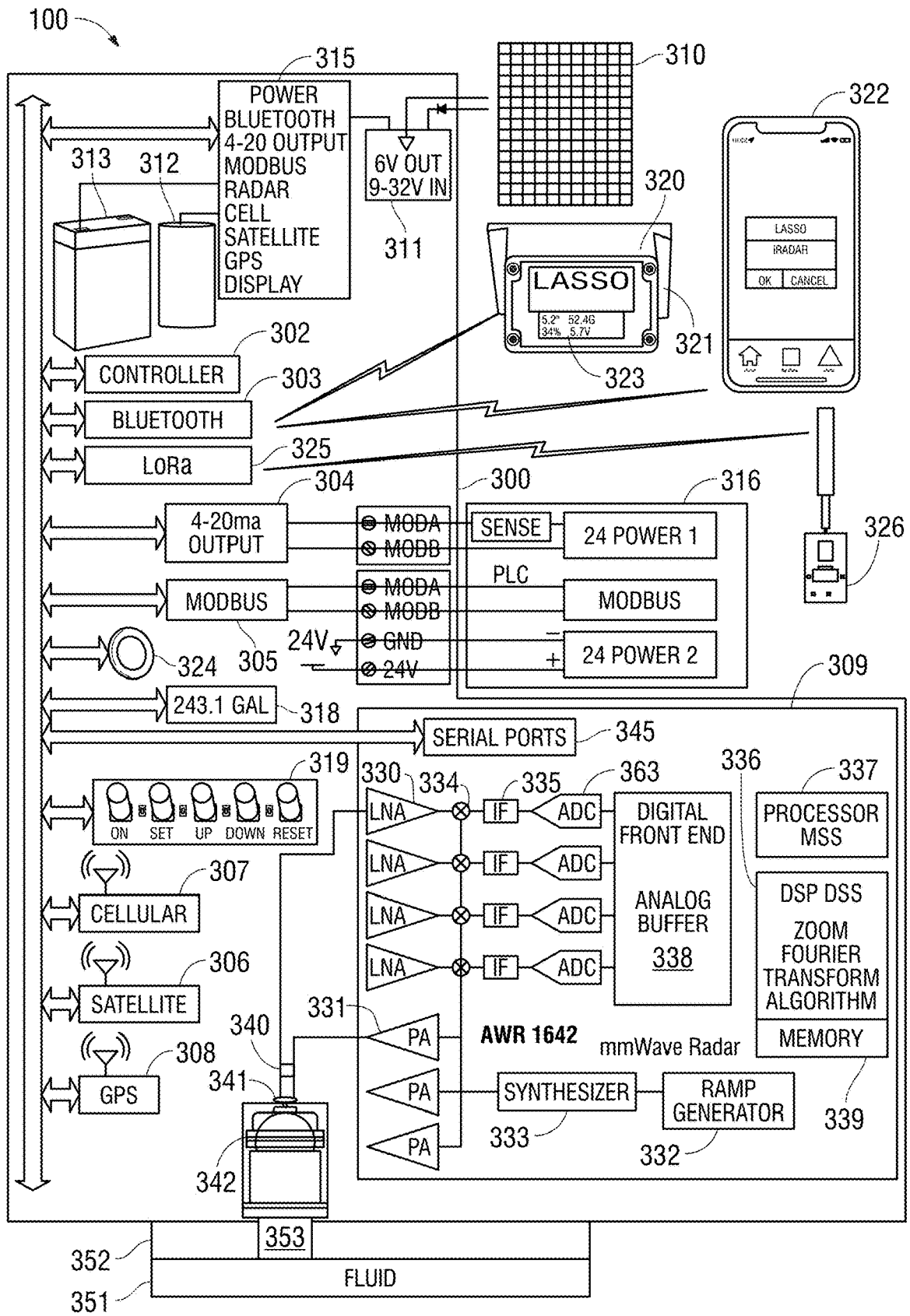
FIG. 3 is a schematic diagram for an exemplary tank level monitor according to an embodiment of this disclosure.

FIG. 3 shows a functional block diagram 300 for the tank level monitor 100. The functional block diagram 300 contains controller 302 which pulls data from radar module 309 and controls other functions of the tank level monitor 100. Controller 302 also is responsible for controlling the power supplied to radar module 309. Radar module 309 automatically boots up and runs one or more configuration profiles to determine multiple distances to the fluid and associated signal strengths. Power is provided using any suitable non-rechargeable battery 312, or a rechargeable battery can be used with battery charger 311, or solar panel 310. Power supply 315 is managed by controller 302 and turned on and off as needed to each major section of the monitor 100 to save battery life.

Controller 302 wakes at intermediate intervals and communicates with other parts of the tank level monitor 100 to take level measurements and send them to the user. After taking measurements, controller 302 puts the tank level monitor 100 in a low power sleep mode to save battery life. Controller 302 will then wake as needed and turn on relevant onboard circuits to repeat the measurement and reporting cycle. Telemetry to off-site locations, such as external web servers, is provided using a cellular module 306 or satellite telemetry module 307. Other wireless technologies such as Bluetooth, Wi-Fi, Z-Wave, ZigBee, WiMax, Sigbox, LoRa, and Ingenu could be implemented for the telemetry module 307 to send data to an end user. In some embodiments, the tank level monitor 100 has a LoRa module 325 to allow data to be sent to a local wireless mesh network near the tank. A LoRa antenna 326 can gather data from similar tank level monitors 100 installed on other nearby tanks and send the data over wired ground networks or cellular or other wireless means to web sites, the user, and other locations.

The geographical location of the monitor 100 can be determined using a GPS module 308. In some embodiments, an external PLC 316 may be used to read data through Modbus circuit 305. Alternatively, a 4-20 mA transmitter 304 can be used to generate a 4-20 mA signal to PLC 316. Other communication methods to external ports, such as HART, could also be implemented. Wake early pushbutton 324 wakes the monitor 100 to take a reading and show the results on display 318. Bluetooth module 303 is used to communicate wirelessly with a separate local display 320. A user can press a button 321 on the local display 320 to read the level and gallons readings 323 for the tank 352. Bluetooth Low Energy (BLE) is used so that Bluetooth module 303 can be available when button 321 is pressed. This is done by using BLE module 303 to wake controller 302 and radar module 309 so that the gallon and level readings 323 are shown to the user. Smartphone 322 and a monitoring app running thereon can also be used to allow the Bluetooth module 303 to be used to program setup parameters for the radar module 309 and see real time updates of the level and volume in the tank, with interactive charts and graphs, and also to see alarms. In addition, a smartphone can be used to wake a sleeping monitor 100 by simply touching any one of the customer's listed devices on their smartphone. Display 318 or smartphone 322 allows the user to see the status of the tank level monitor 100, the level, and the gallons (see FIG. 15), and the programming (see FIG. 16). Keypad 319 allows the user to change the operation of tank level monitor 100, as described in FIG. 16.

The radar module 309 is an AWR1642 radar chip from Texas Instruments in some embodiments. The AWR1642 is a single chip that includes a radar sensor in the 76-81 GHz band with multiple transmit and receive antennas and built-in phase locked loops (PLL) and A/D converters. The AWR1642 chip 309 has one cortex R4F core and one DSP C674x core available for user programming and are referred to as MSS/R4F 337 and DSS/C674X 336, respectively. Basically, the MSS processor 337 controls transmission of the radar signal and the DSS processor 336 processes the received radar signal using advanced mathematics. Ramp generator 332 works with synthesizer 333 to generate the chirps, which may be customized via processor 337. Ramp generator 332 generates a millimeter wave chirp that ramps linearly from a starting frequency to a predefined higher frequency within a set time period. In some embodiments, ramp generator 332 generates more than 30 chirps per frame sample.

The tank level monitor 100 configures the chirp generator to send 64 chirps in some embodiments instead of the more common 10 chirps used in the art. These 64 chirps are averaged, which minimizes much of the noise and also improves the accuracy of the final tank level and volume readings. The quadrature hybrid circuit 340 allows the transmit signal from power amplifier 331 to reach antenna 341 with no feedback to damage the low noise amplifiers (LNA) 330. The Luneburg lens 342 creates a focused RF signal, indicated at 353, from antenna 341 towards fluid 351 in tank 352. The echoed response signal 353 feeds back through the lens 342, and quadrature hybrid circuit 340 to the receive LNAs 330. Only one transmit and receive antenna is used on the AWR1642. Mixers 334 receive and multiply the signal being transmitted with the signal being received that instant from the low noise amplifiers 330 and antenna 341. The product of the mixers 334 creates the intermediate frequency (IF) signal 335 which is sent to the analog to digital converters 363. The digital front end 338 receives the signals and digitizes and stores these values in analog buffers for use by the DSP 336. The DSP 336 performs the signal processing of the received signals and runs a Fast Fourier transform (e.g., Zoom), OS-CFAR, and Blackman routines on each peak of the IF signal to determine distances to fluid.

Processor 337 works with memory 339 to coordinate the various functions on the radar module 309. A single tank level and volume reading can be determined within the DSP 336 and used as the correct distance reading, or the 10 strongest distance readings in terms of signal power can be sent over serial port 345 to controller 302 for further analysis. It should of course be understood that fewer or more than 10 strongest distance readings may be sent for further analysis by controller 302. Satellite telemetry module 306 and cellular telemetry module 307 can be used to transmit data off-site as scheduled or needed. GPS location data is captured using GPS circuit 308.

Figure 4A:
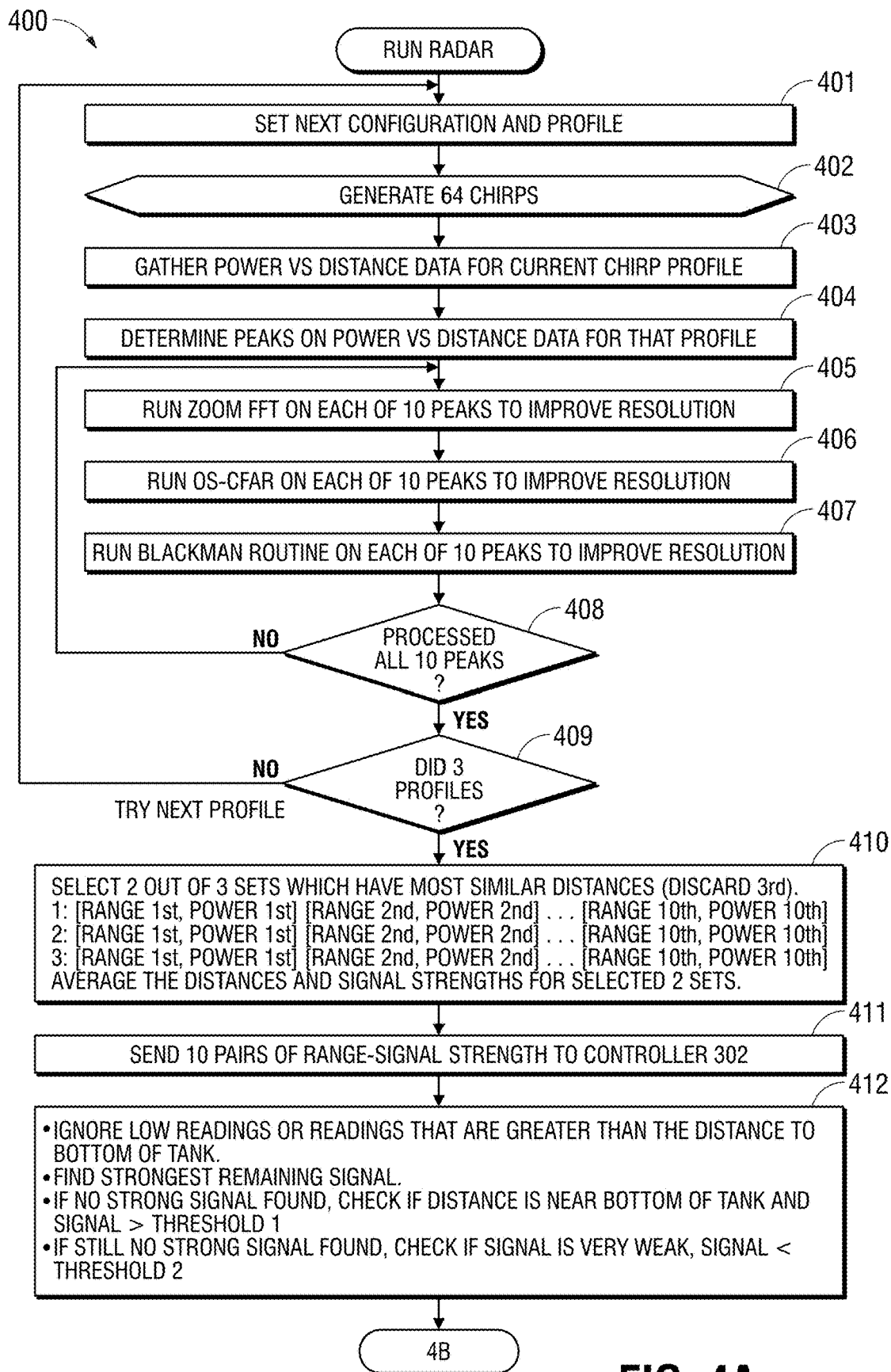
FIGS. 4A-4C are flow diagrams for an exemplary tank level monitor according to an embodiment of this disclosure.
Figure 4B:
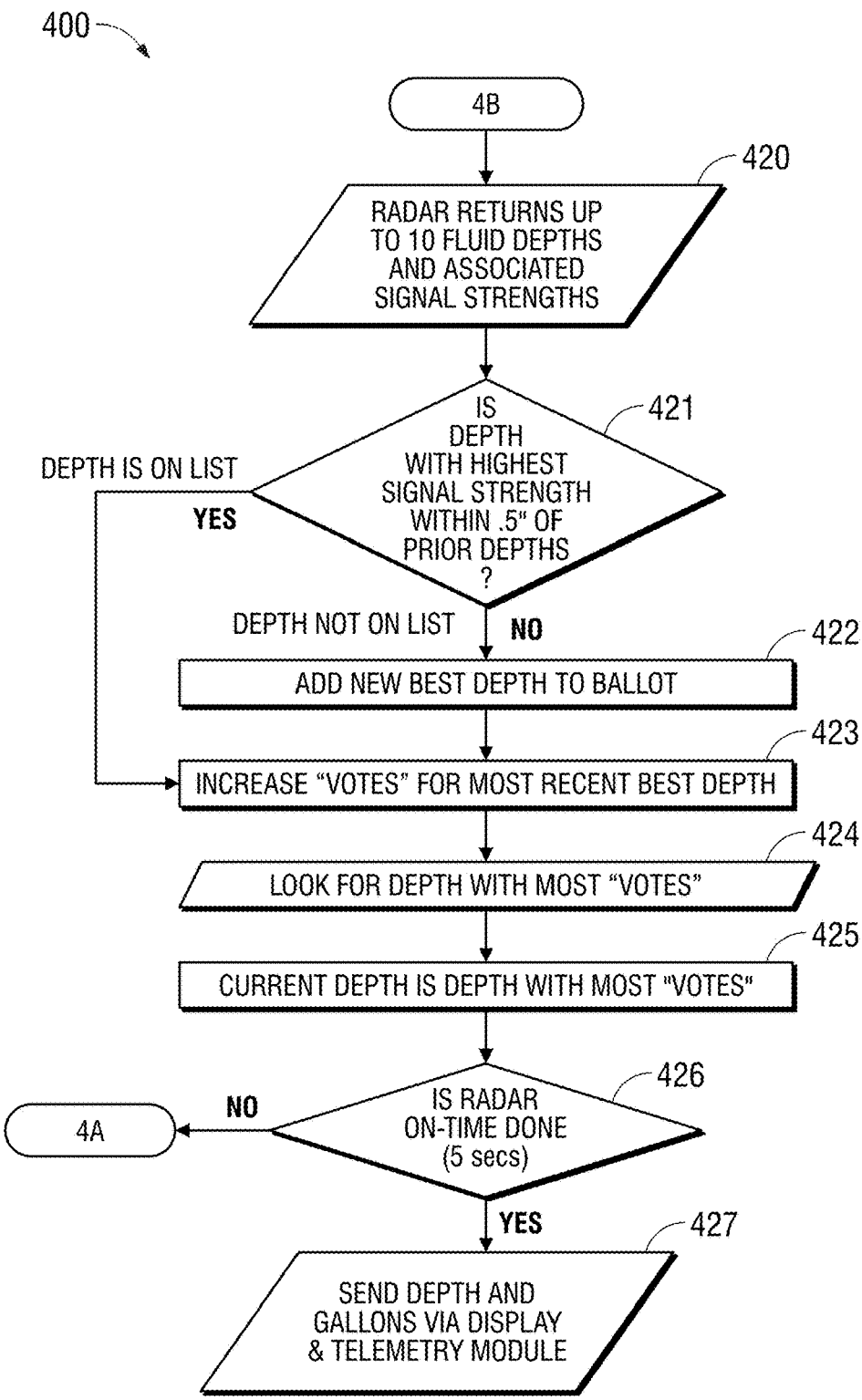
Figure 4C:
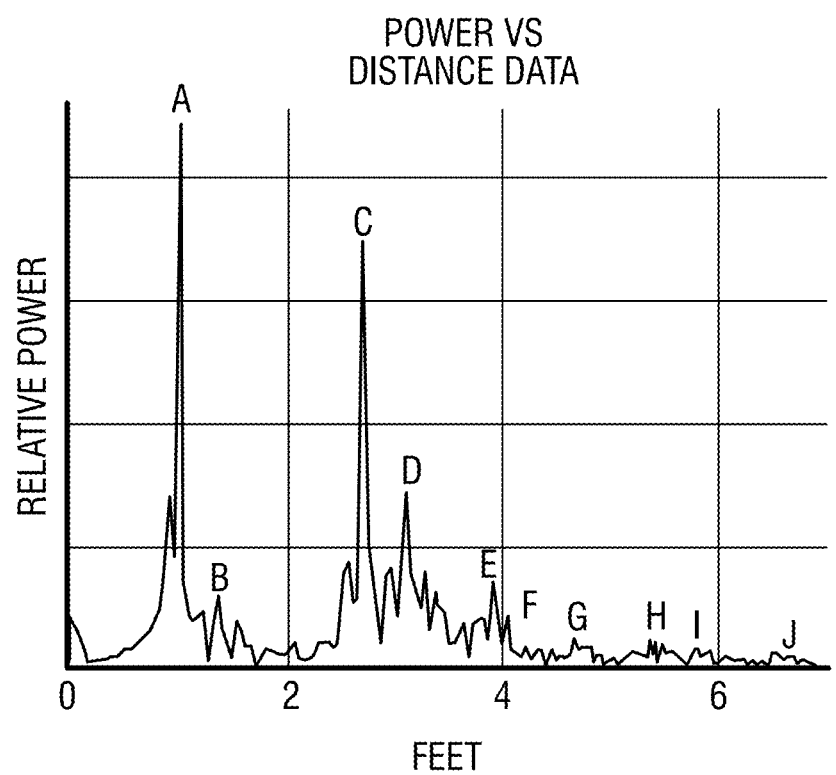

FIG. 4A shows a flowchart 400 outlining the basic steps for processing a radar echo in the tank level monitor 100 in some embodiments, while FIG. 4C shows exemplary signal peaks A, B, C, D, E, F, G, H, I, J generated from an actual radar echo. For most embodiments, 10 data points will be analyzed corresponding to the 10 strongest peaks resulting from the 64 chirps. Any of these 10 peaks could represent the correct fluid level, since multiple echoes are usually returned for each chirp due to reflections within the tank and inherent noise in the radar circuit.

The flowchart 400 generally begins at 401, where the tank level monitor 100, or more specifically the radar module 309 therein, sets the current/next radar chirp configuration profile. At 402, the radar module 309 generates 64 chirps that are transmitted into the tank. Experience has found that increasing the chirp width greatly improves the accuracy of the resulting fluid level readings. Intuitively, increasing the transmitted power would seem to yield better results, but increasing the transmitted power actually increases noise and reflections and can produce erroneous results. Likewise, increasing the received amplification can degrade performance if over-amplification of noisy echoes produces bad level readings. Increasing the chirp loops can improve performance accuracy. Multiple chirp profiles with different transmitted and received power, chirps, chirp widths, and chirp loops are used while determining a valid level.

At 403, the radar module 309 collects data from the return echoes of the current chirp configuration profile. Three chirp configuration profiles are contemplated, although fewer or more than three profiles may certainly be used. The data collected is the signal strength or power for various reflections or echoes resulting from the chirp, along with the corresponding range or distance to the fluid for the reflections based on the signal strength or power.

At 404, the radar module 309 makes an initial determination of the 10 best (strongest) peaks based on the signal strength of the reflections or echoes, along with their range or distance to the fluid. Exemplary peaks A, B, C, D, E, F, G, H, I, J are shown in FIG. 4C. At 405, the radar module 309 runs a Zoom Fast Fourier Transform (FFT) on each of the 10 best (strongest) peaks, or rather the digitized representations of their waveforms. The Zoom FFT determines the spectral components of the peaks in order to determine the distances to the fluid, since distance is directly related to the intermediate frequency (IF). To improve resolution, the radar module 309 uses a Zoom FFT processing technique that enhances the 10 strongest return signals. This is a processing technique that is added as an enhancement to the existing chip software in the DSP 336. Zoom FFT processing of the 10 strongest return signals allows analysis of the fine spectral resolution of each peak of the returned data at high "Zoom" resolution. In some embodiments, the radar module 309 applies the Zoom FFT to each of the 10 peaks (using the DSP 336) as follows:

Frequency translation to shift the frequency range to 0 Hz.
Low-pass filter to prevent aliasing.
Re-sample at a lower rate.
Perform Zoom FFT on the re-sampled data (the resulting spectrum will now have a much higher resolution bandwidth, which results in better distance accuracy).

The above Zoom FFT process is repeated on each of the 10 example peaks A, B, C, D, E, F, G, H, I, J shown in FIG. 4C, resulting in a precise IF for each peak that can be translated into a distance or range to fluid. The result is a set of 10 ranges corresponding to the 10 peaks, each range having a corresponding signal power or strength value, for a given chirp profile, as follows: [RANGE 1st, POWER 1st] [RANGE 2nd, POWER 2nd] . . . [RANGE 10th, POWER 10th].

At 406, the radar module 309 applies a filter to the data from 404 to eliminate false range or distance readings for each of the 10 values. This is to account for real-world tanks that often produce spurious reflections and echoes, potentially resulting in false distance readings, making detecting the correct distance challenging. In some embodiments, the filter applied by the radar module 309 is a mathematical algorithm, such as the well-known Order Sorted-Constant False Alarm Rate (OS-CFAR) algorithm, to minimize false readings. Background noise and false reflections can cause noise problems, so setting an accurate signal strength threshold for the returned signal is challenging. Setting a frequency threshold level for all distance readings does not work since the noise floor varies for different distance readings. The OS-CFAR algorithm uses a varying threshold based upon the present noise level, which is independent of the surrounding noise power for the underlying noise model, as determined by evaluating neighboring frequencies using a sliding window to inspect all frequencies. A changing threshold is calculated from the signal-to-noise ratio of the fluid echo return by estimating the noise floor near the frequency of interest and calculating the average power level. A frequency and thus distance is valid if it exceeds this threshold.

At 407, the radar module 309 runs additional filtering, for example, by applying a Blackman filter routine, to the data from 404 to smooth the data. The well-known Blackman filter is effective for pulling out very small signal levels which are superimposed on larger signals.

At 408, the radar module 309 checks whether Zoom FFT, OC-CFAR, and the Blackman routines have been run on all 10 peaks. If not, then the radar module 309 continues until all 10 data points are processed. The resulting 10 ranges and corresponding signal strengths are then stored for that chirp profile. An exemplary set of samples or data for a given chirp profile may resemble the following: [210.9, 60.6] [334.3, 138.7] [459.7, 17.3] [658.8, 1.0] [824.5, 0.4] [914.2, 0.3] [1007.8, 0.2] [1102.4, 0.2] [1680.4, 0.2] [1748.4, 0.2] where range is in millimeters (mm) and power is in decibels (dB), respectively.

At 409, the radar module 309 checks whether three chirp configuration profiles have been run as described above, with 10 ranges and corresponding signal strengths stored for each of the three chirp profiles. This results in three sets of samples or data, one set for each chirp configuration profile, each set containing 10 range-power pairs per profile. Each set of data is sometimes referred to herein as the "response" resulting from a given chirp profile.

At 410, each of the three responses are evaluated and the two responses that have the most similar ranges/distances to one another are selected. In some embodiments, the evaluation involves comparing the ranges/distances of the three responses to determine which two responses line up most closely with one another (i.e., have the smallest variations). Several ways exist for performing the comparison, including comparing individual ranges/distances within one response to another, averaging the ranges/distances and comparing the average for one response to another, and the like. Three exemplary responses are shown below, Res 1, Res 2, and Res 3:

Res 1: [RANGE 1st, POWER 1st] [RANGE 2nd, POWER 2nd] . . . [RANGE 10th, POWER 10th].
Res 2: [RANGE 1st, POWER 1st] [RANGE 2nd, POWER 2nd] . . . [RANGE 10th, POWER 10th].
Res 3: [RANGE 1st, POWER 1st] [RANGE 2nd, POWER 2nd] . . . [RANGE 10th, POWER 10th].

Of these three responses, assume that Res 2 and Res 3 have ranges/distances that are most similar to one another. In that scenario, Res 2 and Res 3 are selected while the first response, Res 1, is discarded or otherwise not used. The radar module 309 then averages the range values and the power values for these two responses, Res 2 and Res 3, to produce a single set of 10 range-power pairs. This approach has been found to consistently produce the most accurate results.

At 411, the radar module 309 sends the data for further analysis by the controller 302. The controller 302 attempts to select the best range-power pair from among the 10 range-power pairs. The selected range-power pair is then placed on a "ballot" along with other (previously selected) range-power pair candidates and put to a "vote" to determine the best candidate thus far. This process helps to weed out bad readings that sometimes get repeated.

In some embodiments, the controller 302 selects the best range-power pair from among the 10 range-power pairs by ignoring distances that are too close to the top of the tank (i.e., signal strength above a certain decibel level) or too large such that they extend beyond the bottom of the tank. This may be done by setting appropriate signal strength or distance thresholds or windows (i.e., minimum and maximum acceptable signal strength level and distance level). For example, the signal strength threshold may be a decibel level representing 10 inches from the fluid to the top of the tank (i.e., too close to the top), or three inches of fluid remaining in the tank, or some other decibel level indicating that the tank is effectively empty. The controller 302 then selects the remaining range-power pair having the strongest signal as the best candidate.

If no strong signal is found, the controller 302 then checks whether there is a signal with a distance near the bottom of tank, but still greater than a first threshold representing a depth near the bottom of the tank (i.e., signal>threshold 1 (roughly 10 dB)). If yes, then the range-power pair for that signal is selected as the best candidate from the 10 pairs. If still no strong signal is found, then the controller 302 checks whether the signal is very weak, less than a second threshold representing an effectively empty tank (i.e., signal<threshold 2 (roughly 3 dB)). In that case, the controller 302 puts a range-power pair that represents an empty tank on the ballot. The thresholds and windows can be set automatically by the monitor 302 for a given tank, or they can be set manually by users and revised from time to time as needed.

The above process allows signals that have a reasonable strength level, but are not necessarily the strongest signal, to still be considered in determining a correct distance measurement. Using a signal strength threshold for echoes that are more distant means that the echoes with the strongest power value will not necessarily be used, but this is likely to produce the correct distance to the fluid. This is because, for example, data for peak A may indicate a strong echo, but that echo may be due to an obstruction near the top of the tank and does not represent the correct distance to the fluid. On the other hand, data for peak B may represent the correct distance measurement, even though it has only 80 percent of the maximum signal strength shown by peak A. The approach taken at 412 thus allows distances that most likely represent the correct distance to be used instead of using incorrect distances based on the strongest peaks. The final most likely depth value candidate is then "voted," as continued in FIG. 4B.

Referring to FIG. 4B, even though special filtering, advanced math and other techniques are used to determine the correct distance to the fluid, spurious random incorrect distances sometimes are returned by the radar module 309. Additional measures can be implemented to prevent incorrect readings from being presented to customers. To this end, a list of the candidate distances determined by the controller 302 are maintained at 420 during the time period that the radar module 309 is on (e.g., 5 seconds). During this radar on-time, the radar module 309 runs the three chirp configurations twice per second, resulting in 10 runs. The controller 302 thus produces 10 best range-power pair candidates per each 5-second run of the radar module 309. Each of these 10 range-power pair is potentially a candidate to be voted on as the correct fluid depth.

At 421, the controller 302 determines, from the 10 fluid depths returned by the radar module 309, whether the fluid depth with the highest signal strength is within a predetermined variation, such as 0.5 inches or a certain percentage, of the prior depths. If yes, then that depth (i.e., one with the highest signal strength) is considered to be already included on the current list or "ballot" of depths. The flowchart 400 then proceeds to 423 and a "vote" is cast for that existing best depth. If no, then the depth is considered to be a new best depth, and the new best depth is added to the "ballot" at 422. A vote is again cast for the best depth at 423. The radar module 309 typically stays on for 5 seconds and reads around 15 depth/distance measurements during that time. At the end of the 5 seconds, the controller 302 looks for the depth/distance with the most votes at 424, and that depth is presented to the user as the "correct" depth/distance at 425. At 426, the controller 302 checks whether the radar module 309 On-time is done. If not, then the flowchart 400 returns to FIG. 4A and continues the process. If yes, then at 427, the controller 302 presents the depth/distance with the most votes the user via the displays and/or the telemetry module.

Thus, by using multiple chirp configuration profiles, filtering, and voting as described above, the tank level monitor 100 provides a depth detection method that is extremely reliable and accurate.

Figure 5A:
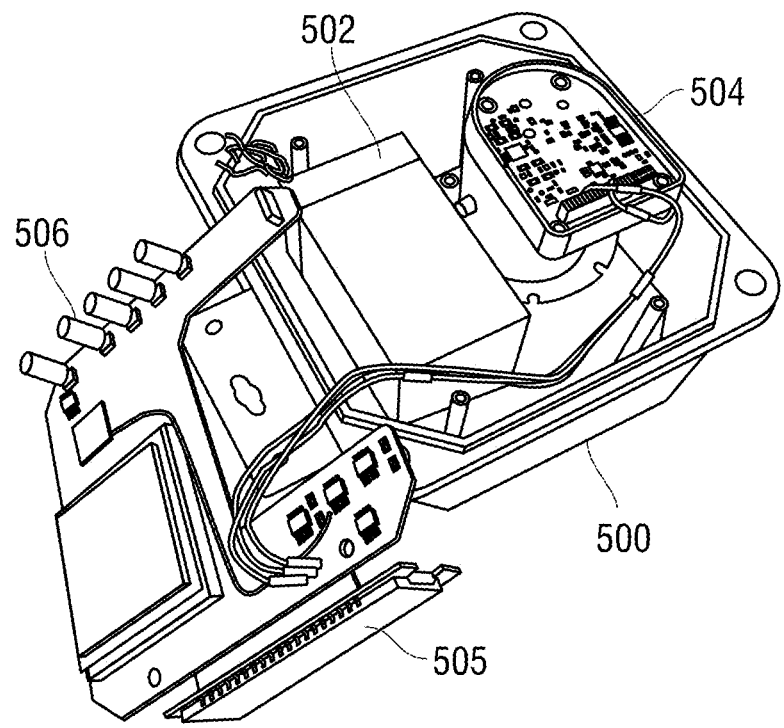
FIGS. 5A-5B are interior views showing a radar board for an exemplary a tank level monitor according to an embodiment of this disclosure.
Figure 5B:
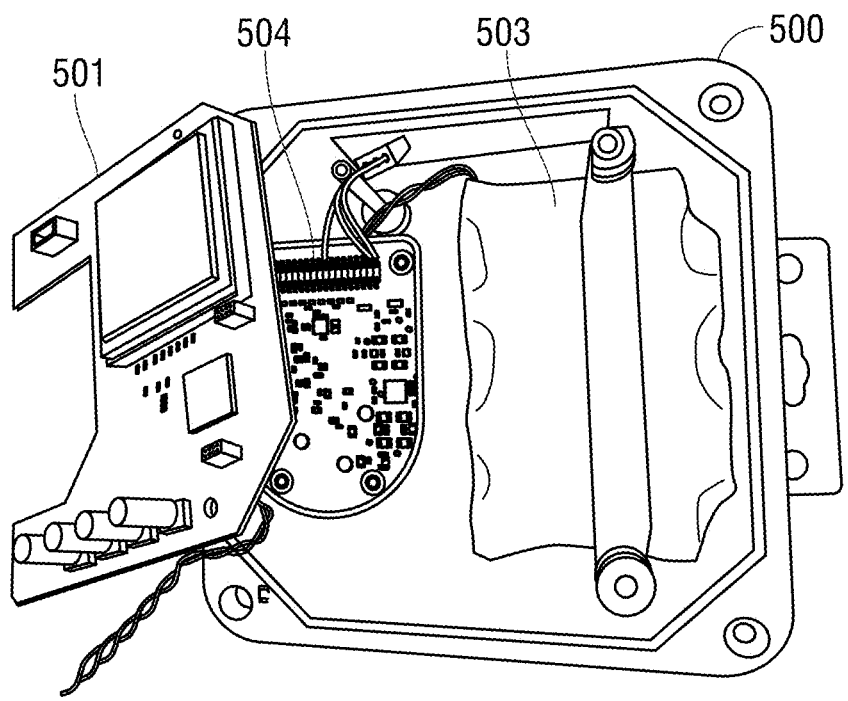

FIGS. 5A-5B show an exemplary embodiment of the tank level monitor 100 partially disassembled. As can be seen, the tank level monitor 100 comprises an enclosure 500, a battery 502 or rechargeable battery 503, main control board 501, display 505, and programming buttons 506. The battery can take on many forms, such as a sealed lead acid battery 502 or Lithium Thionyl Chloride battery 503. A radar assembly 504 is also shown that sends the distance measurements to the main control.

Figure 6A:
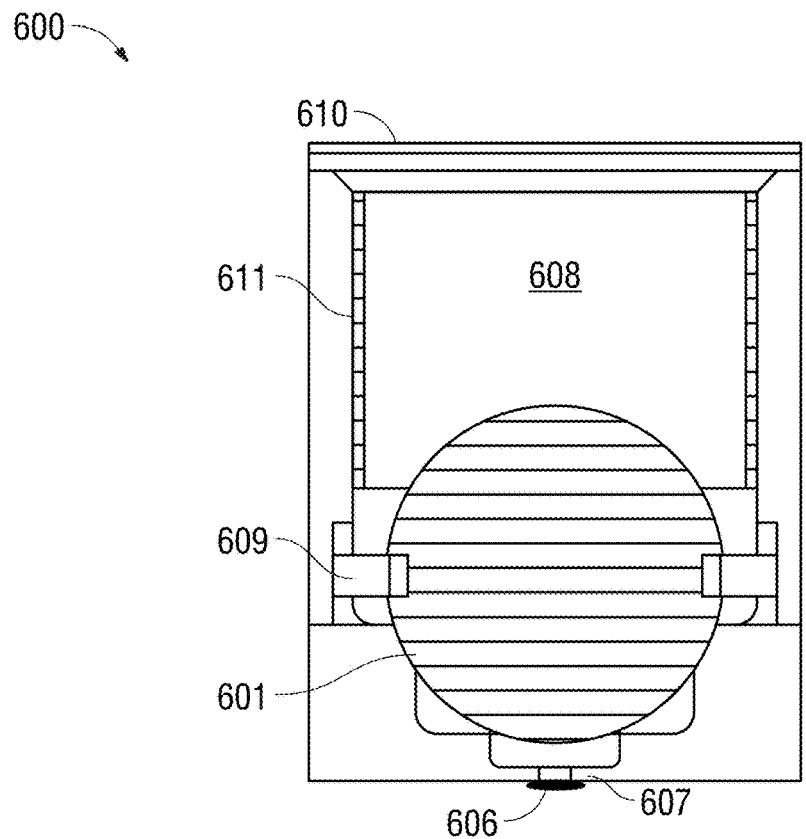
FIGS. 6A-6C are schematic diagrams for a Luneburg lens used in an exemplary tank level monitor according to an embodiment of this disclosure.
Figure 6B:
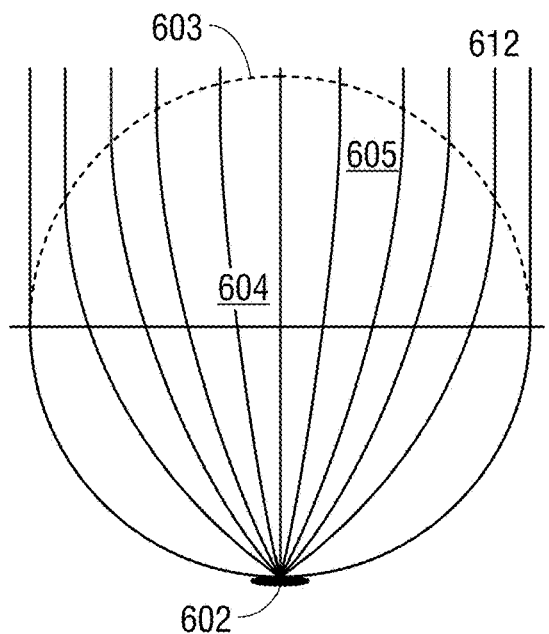
Figure 6C:
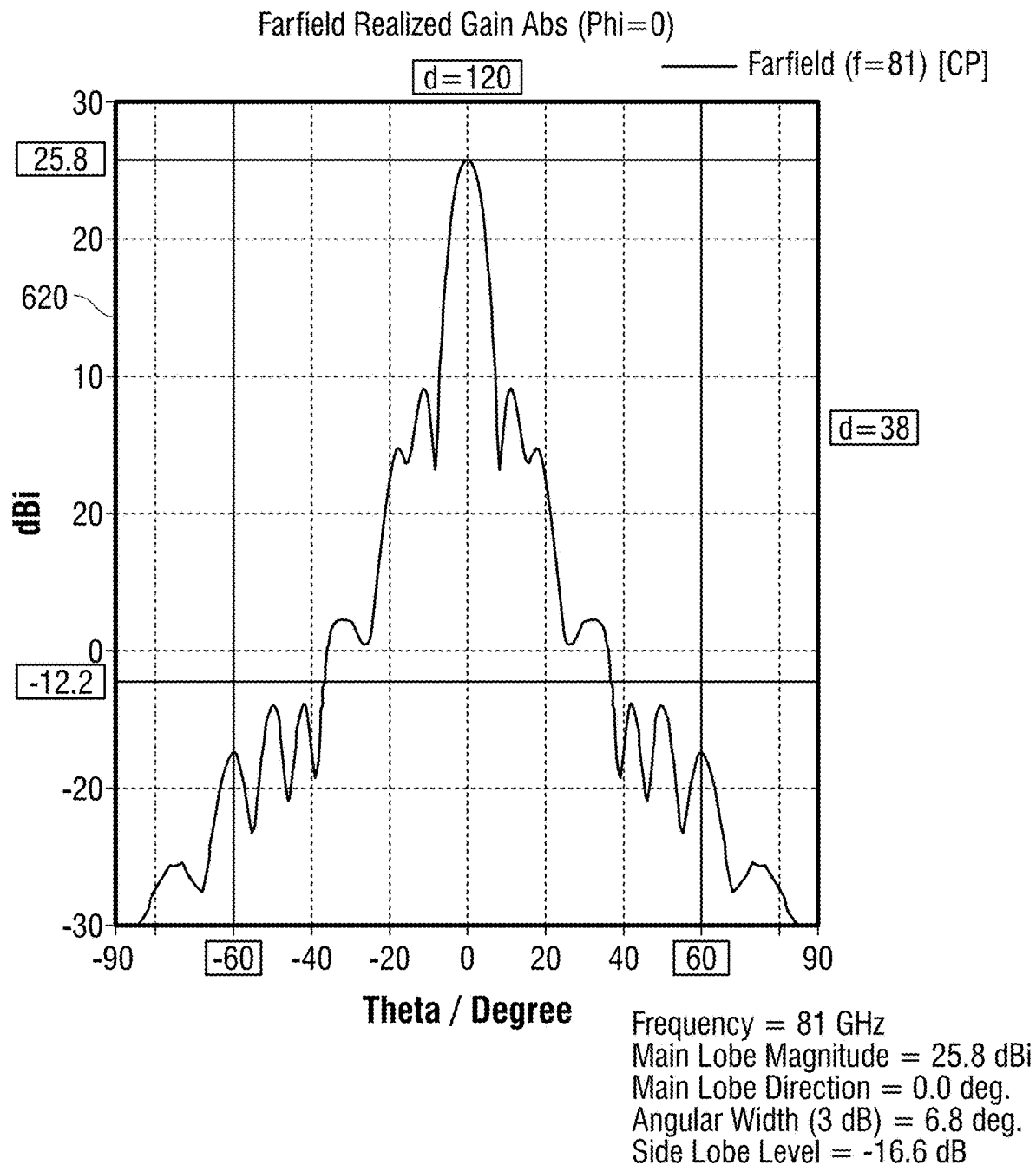
Figure 7A:
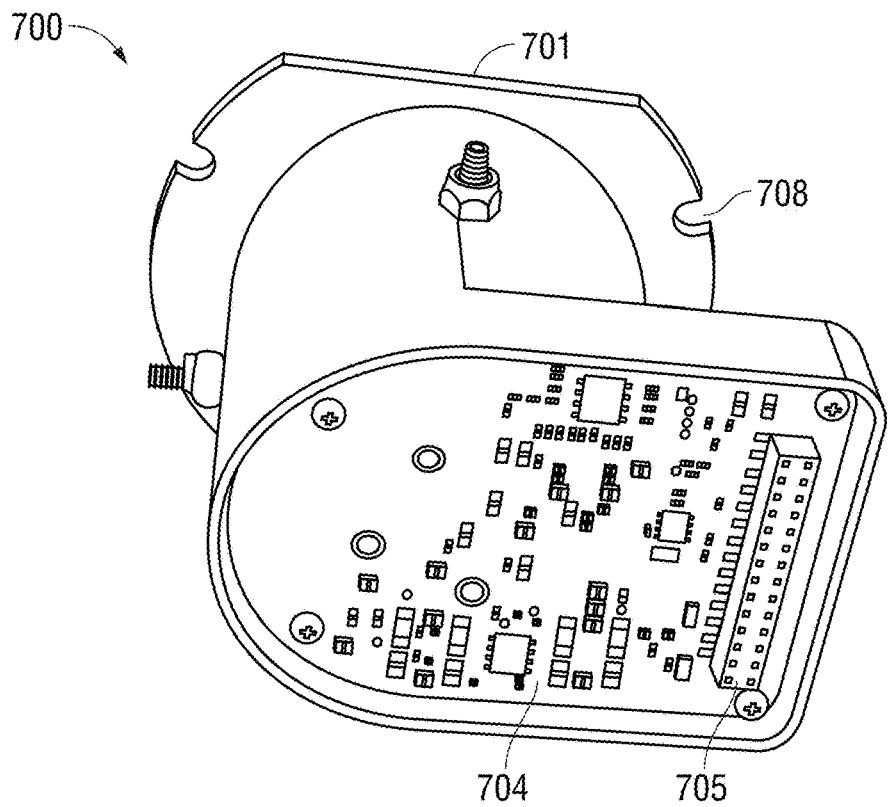
FIGS. 7A-7D are interior views showing a radar assembly for an exemplary tank level monitor according to an embodiment of this disclosure.
Figure 7B:
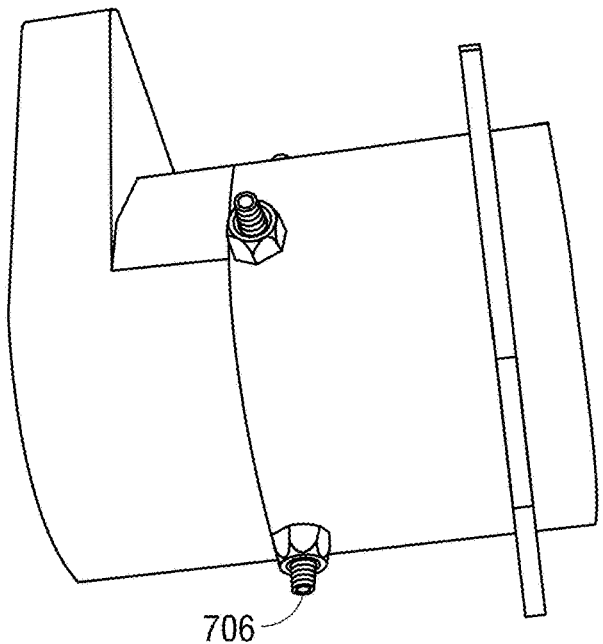
Figure 7C:
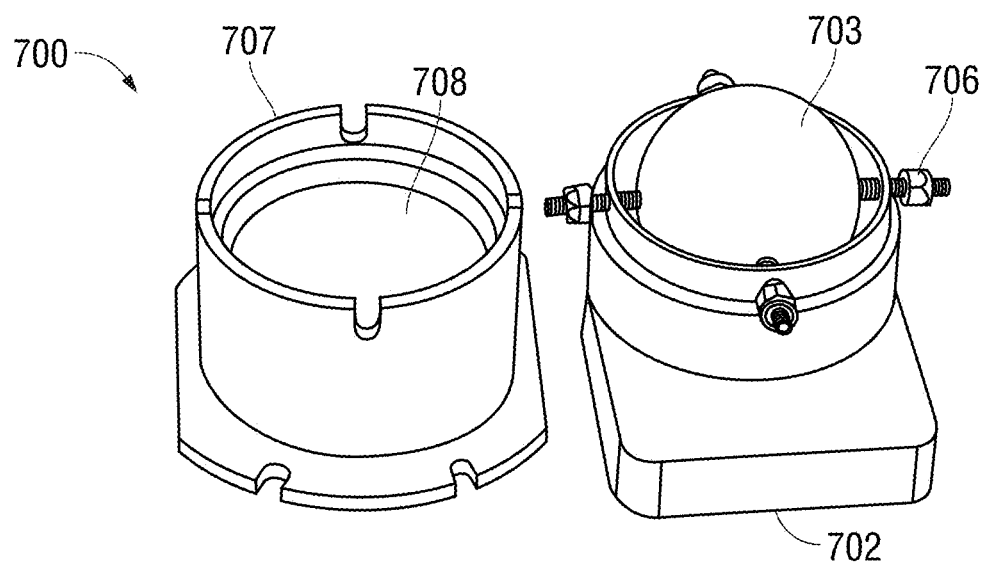
Figure 7D:
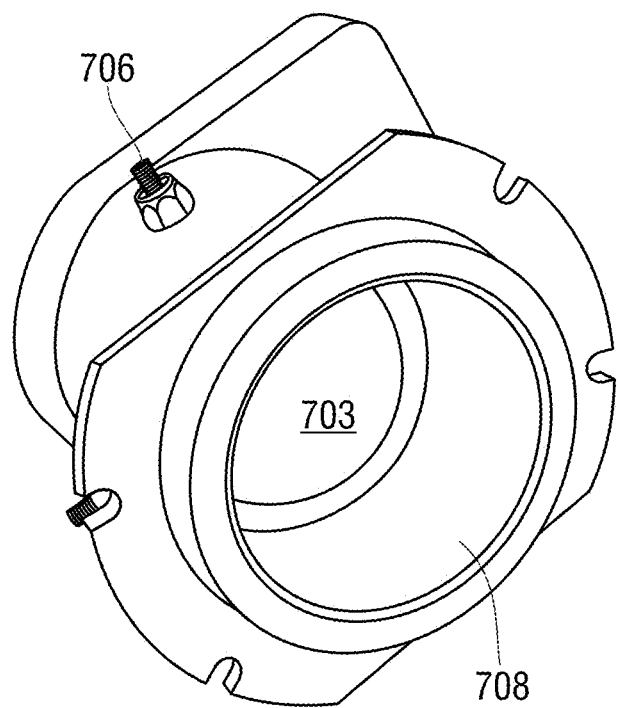

FIGS. 6A-6C show an exemplary horn 600 that may be used in some embodiments to focus the radar energy on the fluid. As this cut-away view shows, the horn 600 includes a lens 601 and antenna arrangement that is used to focus the radar energy on the fluid. The lens is a Luneburg lens 601, which is a spherically symmetric (ball shaped) gradient-index lens that can transform the spherical wave of a point source placed on its surface into plane waves on the opposite side of the lens. A Luneburg lens' dielectric constant ideally is 2 at the center 604 and gradually decreases to 1 on the outer surface 603 to match the dielectric of air. Ideally, the lens will start from a focal point on one side and parallel radiation on the opposite side with a focal point of infinity and plane waves. Within the lens, the paths of the rays are arcs 605. On the surface, no reflection or bending occurs creating parallel rays 612. Many variations of a Luneburg lens have been developed over the years. This tank level monitor 100 uses a solid Teflon ball 601 as a lens which has low tangent losses, and a dielectric constant of about 2.2, which results in a performance similar to an ideal Luneburg lens at much less cost. Other radar compatible plastics such as Rexolite, Preperm, or Polyethylene can also be used instead of Teflon. The RF signal is emitted from antenna 606 through the waveguide 607 and into the lens 601. Plastic screws 609 support the ball using drilled dimples. The wave planes pass through cavity 608 and through the enclosure wall 610. The lens focuses the beam into a tight pattern 620 with minimal side lobes which can pass FCC requirements for tank level measurement. Several other antennas tried do not come near this performance.

FIGS. 7A-7D show different views of the radar assembly 700. The radar assembly 700 is comprised of a housing 702, the Luneburg lens cement tree and a radar board 704 which contains the radar, quadrature hybrid circuit, radar computer, and antenna. Housing 702 contains the radar circuit board 704 and mates with assembly cover 707. Assembly cover 707 may be lined with radar absorbing rubber 708 to help meet FCC radiation requirements. Header 705 is used for programming and connection to the main control board 302. Luneburg lens 703 is suspended in the center of the assembly cover 707 using plastic screws 706 in some embodiments.

Figure 8A:
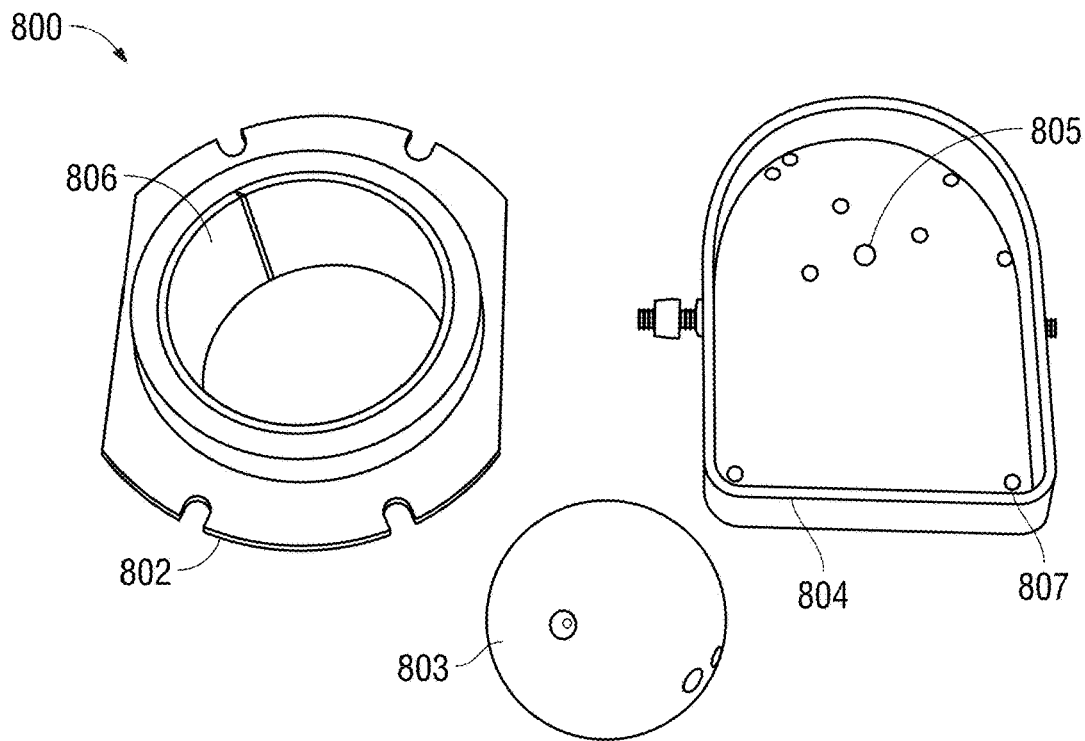
FIGS. 8A-8B are views showing a radar assembly housing for an exemplary tank level monitor according to an embodiment of this disclosure.
Figure 8B:
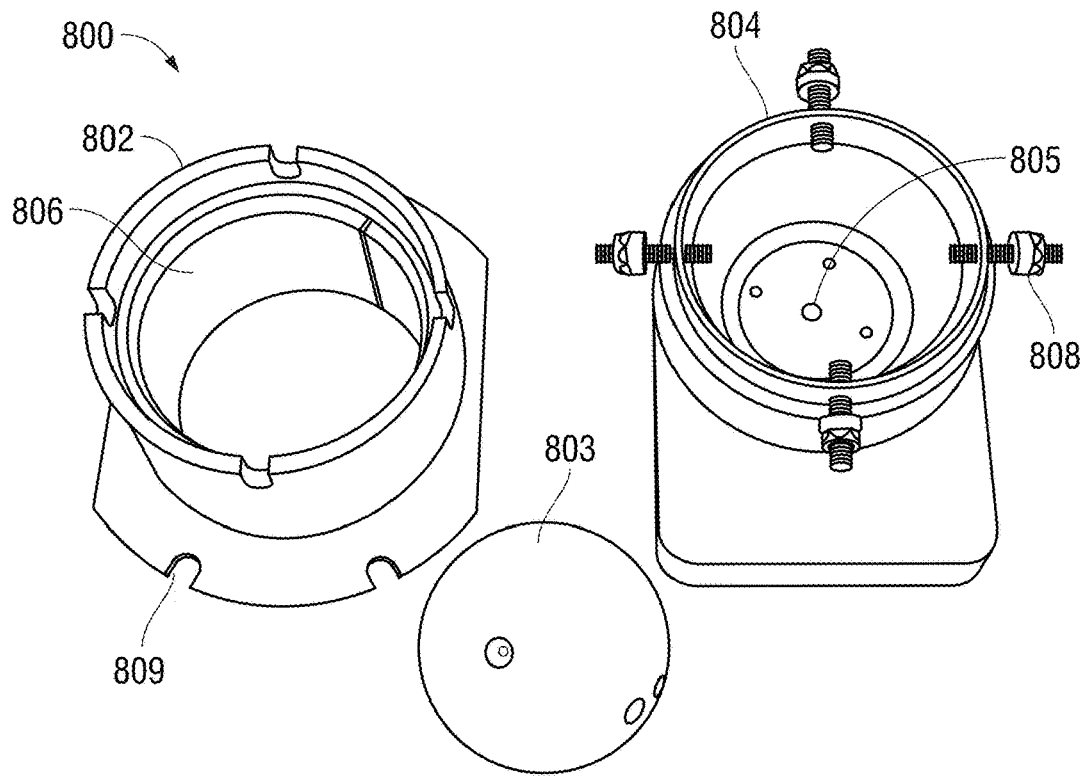

FIGS. 8A-8B show the exemplary radar housing in more detail. The radar housing or enclosure 800 is generally made of two halves, and upper half 802 and a lower half 804. Radar absorbing material 806, such as ARC SB-1006, lines the inside of the upper half 802 to decreases RF side lobes. Plastic screws 808 suspend the Luneburg lens 803 to provide separation from the housing so the RF power is not altered, and also holds the two halves together. Waveguide 805 directs the RF energy from the patch antenna (i.e., the metal trace antenna pattern in the circuit board (see FIG. 7A at 704) to the Luneburg lens. Threaded holes 807 are provided to screws and secure the radar board in place. Mounting holes 809 are used to fasten the upper half to the bottom half of the enclosure 800.

Figure 9:
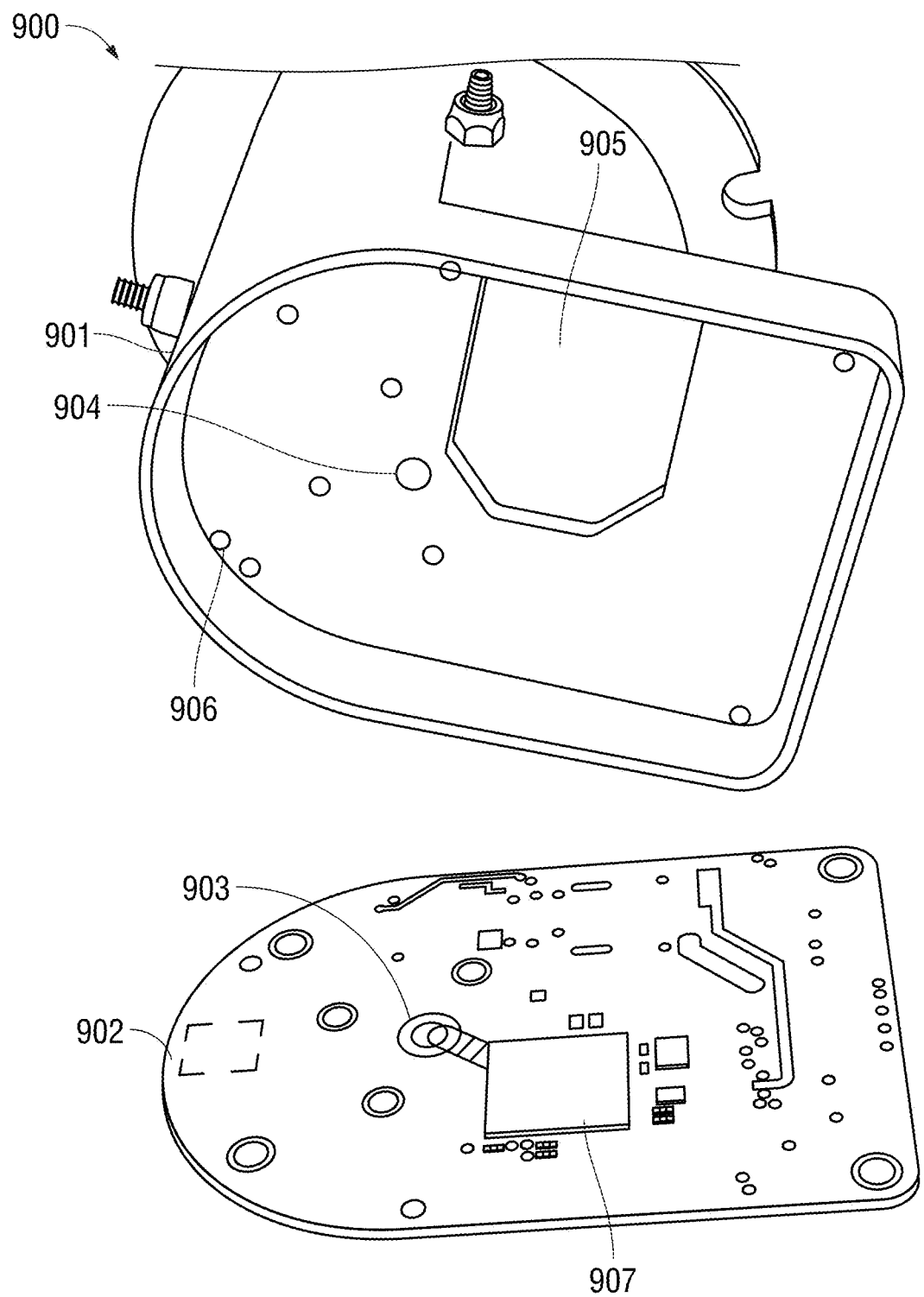
FIG. 9 is a bottom view of the radar assembly housing for an exemplary tank level monitor according to an embodiment of this disclosure.

FIG. 9 shows a further view of the radar assembly at 900. The radar housing 901 contains the Luneburg lens and the radar board. Radar chip 907 is one of the mmWave products from TI, in this case the AWR1642. This powerful radar chip handles the RF signals necessary to determine distance. Antenna contact 903 feeds the signals from the patch antennas into waveguide 904. Alignment posts 906 mate with radar board 902. Pocket 905 provides clearance for the radar chip 907. Circuit board 902 is the radar board and has six trace layers and special plating to maximize performance.

Figure 10:
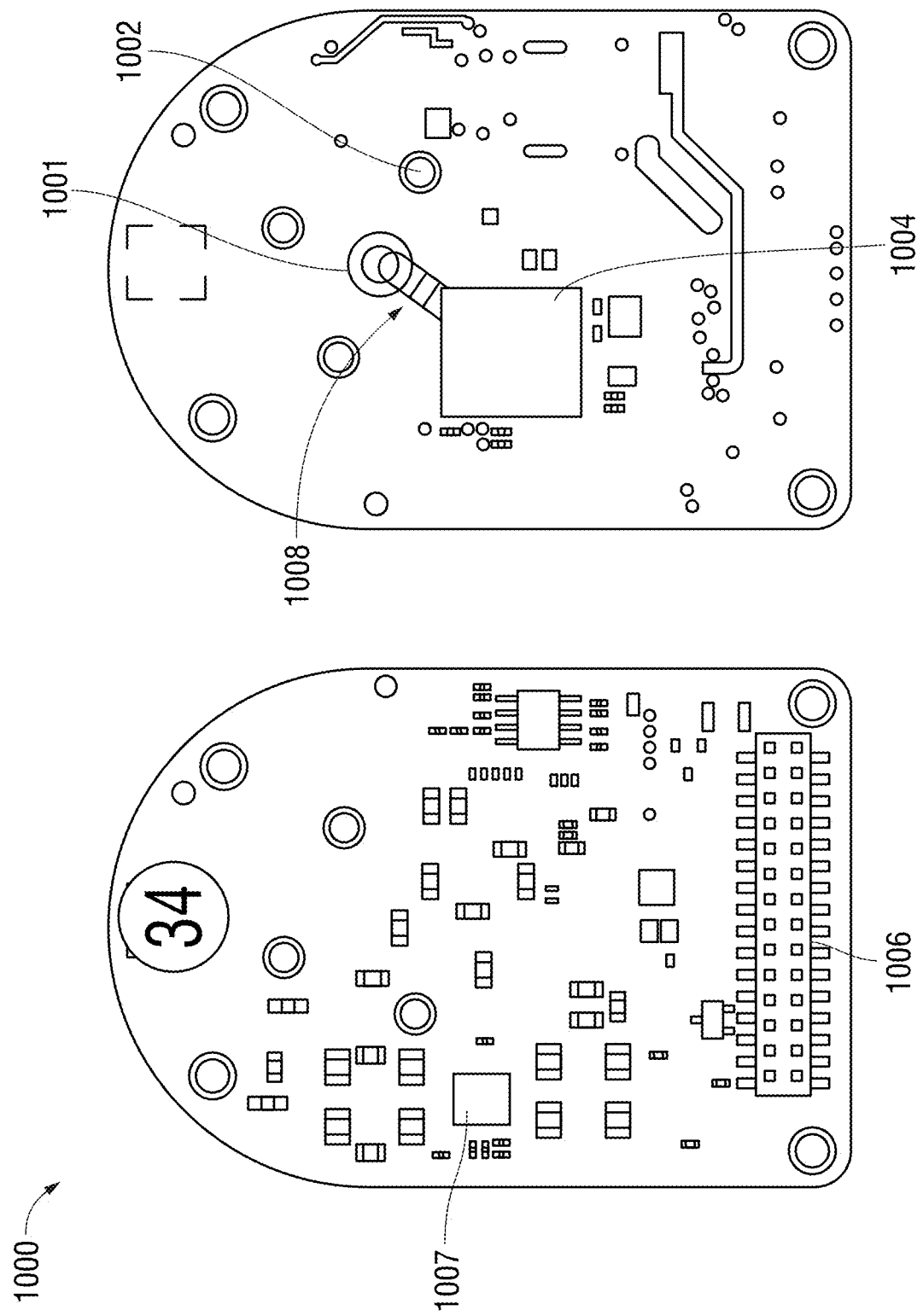
FIG. 10 shows front and back views of a radar board for an exemplary tank level monitor according to an embodiment of this disclosure.

FIG. 10 shows the radar board 1000 in more detail. The radar board 1000 has a power section 1007, debug-programming connector or header 1006, and can interface directly to controller 302. Quadrature hybrid circuit 1008 with dual antenna feeds is diagrammatically shown but the actual traces are on an internal layer within the board. Antenna contact 1001 feeds the Luneburg lens discussed earlier. Screws-in holes 1002 allow the board to be anchored to the radar housing. The mmWave radar AWR1642 can be seen at 1004 and is also represented elsewhere herein by reference 309.

Figure 11A:
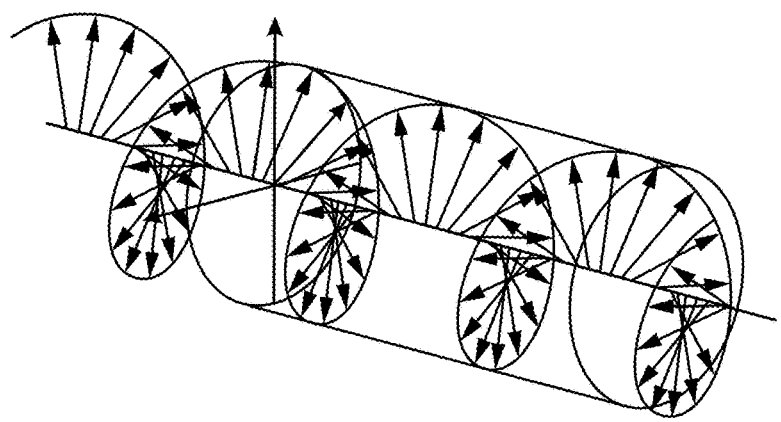
FIGS. 11A-11C are schematic diagrams showing a quadrature hybrid circuit for an exemplary tank level monitor according to an embodiment of this disclosure.

FIG. 11A shows the circular polarization of the RF energy, which is the ideal waveform desired to improve the likelihood that a signal will be reflected. In a circularly polarized antenna, the plane of polarization rotates in a corkscrew pattern making one complete revolution during each wavelength. Since circular polarized antennas send and receive in all planes, the signal strength stays strong as the signal transfers to a different plane.

Figure 11B:
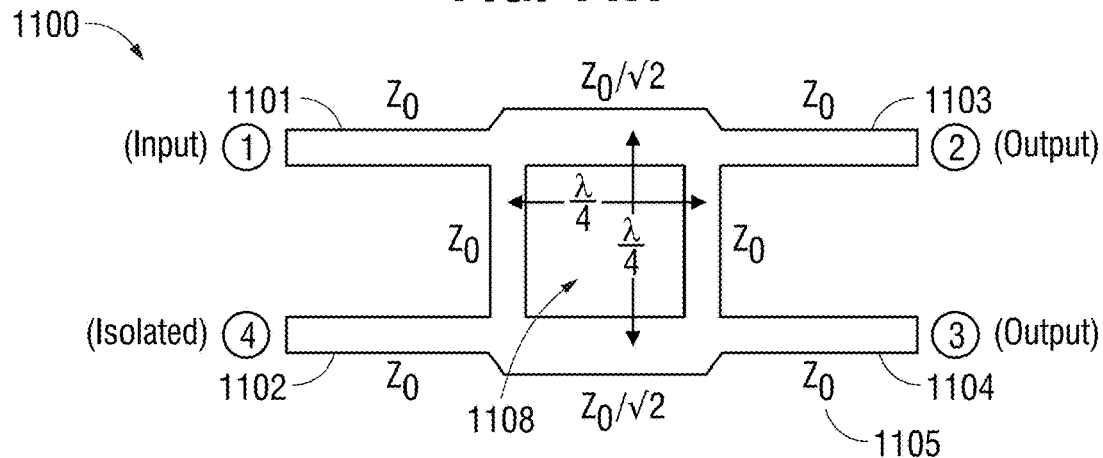
Figure 11C:
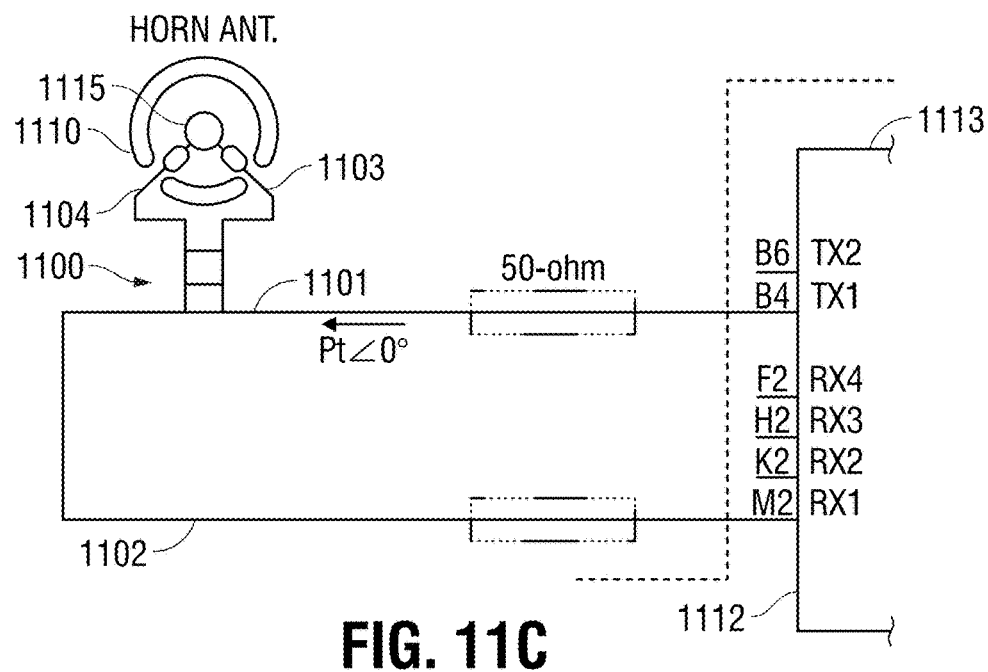

FIG. 11B shows a schematic diagram of a quadrature hybrid circuit 1100. The quadrature hybrid circuit 1100 allows the use of a Luneburg lens with high gain, narrow beam width and a single antenna used for both the transmitter and receiver. As seen in FIG. 11C, the quadrature hybrid circuit 1100 is basically a power splitter that divides an input signal 1101 into two outputs 1103 and 1104 having a 90° phase shift therebetween. The transmit power from the radar chip 1113 (AWR1642) has a 90° phase difference after passing through the quadrature hybrid circuit 1100, which is connected to the two axes 1103 and 1104 of a waveguide feeding antenna 1115 to emit circularly polarized waves. The power of the input signal 1101 is split equally between the coupled through-ports 1103 and 1104 with a 90° phase difference. Signal power reflection is prevented from damaging the Receive (RX) input 1112 of the radar chip 1113 because the coupled ports are isolated by a resistor on line 1102 from the output ports 1103 and 1104 and due to the nature of a quadrature hybrid circuit. The RF energy reflected by the tank fluid enters antenna 1115 and feeds into axes 1103, 1104 and back through the quadrature hybrid 1100. Phase shifts in the quadrature hybrid direct the energy back over the line 1102 into the receive signal 1112. No power goes back to the Transmit (TX1) pin 1101 since this is now the isolated port on the quadrature hybrid. Ground 1110 surrounds the antenna to maintain 50 ohms impedance matching. The physical dimensions of the rectangular aperture 1108 in the quadrature hybrid circuit 1100 are $\lambda/4$, or about 1 mm by 1 mm at 80 GHz. The impedance of the quadrature hybrid 1105 Zo is 50 ohms.

Figure 12A:
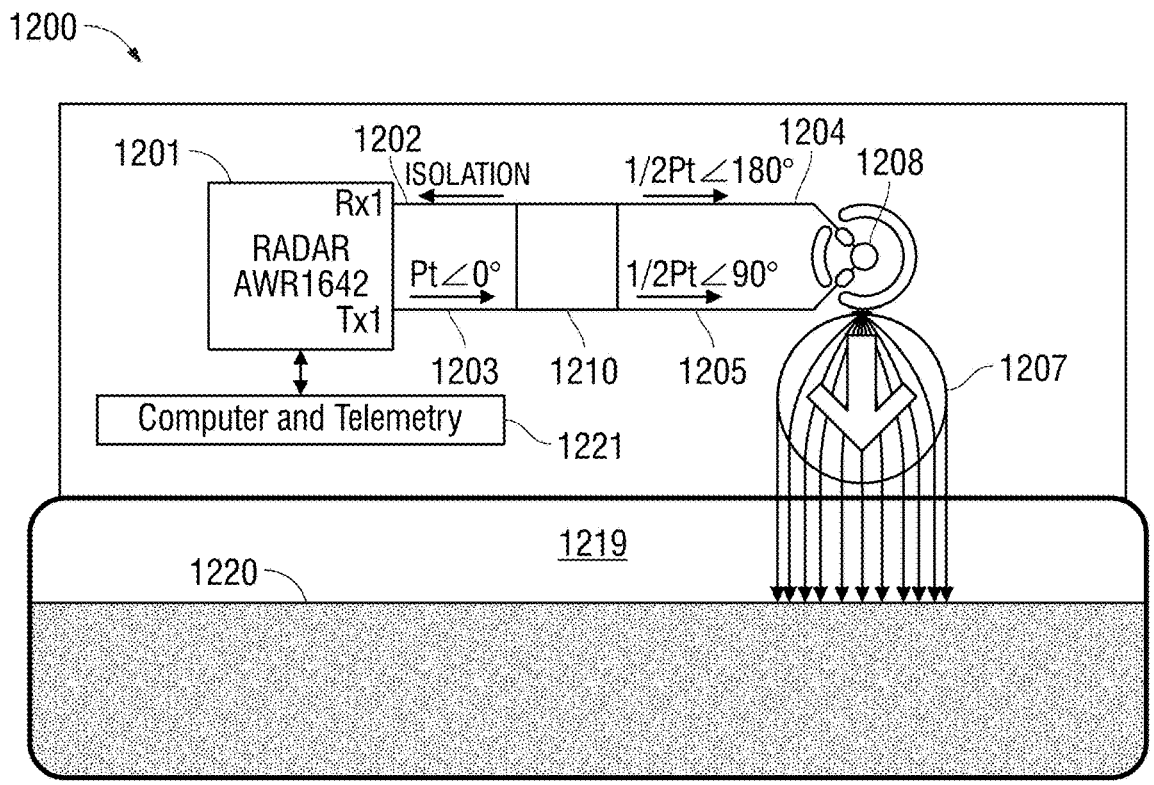
FIGS. 12A-12B are circuit diagrams showing operation a quadrature hybrid circuit for an exemplary tank level monitor according to an embodiment of this disclosure.
Figure 12B:
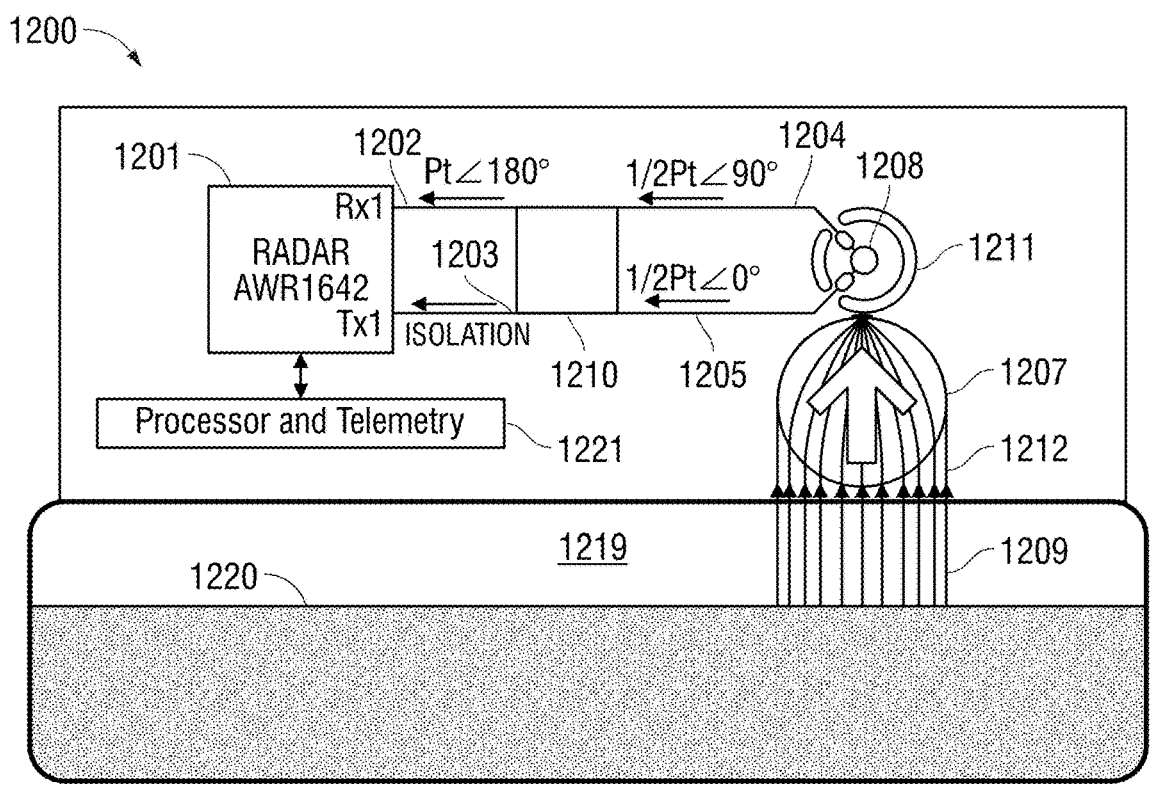

FIGS. 12A-12B graphically illustrates two signals that are 90 degrees apart as applied to two inputs on a patch antenna in the radar board 1200. This will create a circularly polarized radar signal. The quadrature hybrid circuit described above, and the patch antenna are etched onto the radar circuit board 1200. When the radar chip 1201 transmits, it sends a chirp, indicated that 1203, with a transmit power and phase angle of zero. The quadrature hybrid circuit 1210 splits this incoming power in half into two signals 1204 and 1205 at 90 degrees and 180 degrees apart from the incoming phase. The signals combine in antenna 1208 to create a circular polarized radar signal. The RF signal from antenna 1208 passes through Luneburg lens 1207, through the air in the tank 1219 and is reflected by the fluid 1220 therein. When the RF signal is reflected by the fluid, the signal passes through the Luneburg lens 1207 into antenna 1208 and again the signal is split into two half power signals 1213 and 1214 which are 90 degrees apart. They pass through the quadrature hybrid 1210. Due to the nature of the quadrature hybrid, no power is returned to the Transmit (TX) port and all power goes to the Receive (RX1) port. The Transmit (TX) port becomes the isolation port for the quadrature hybrid circuit. Reflections from mismatches sent back to the output ports are cancelled by the radar chip 1201. The processor and the telemetry module, both generally indicated 1221, direct the generation of chirps, data gathering, and determination of the depth level as described previously.

Figure 13A:
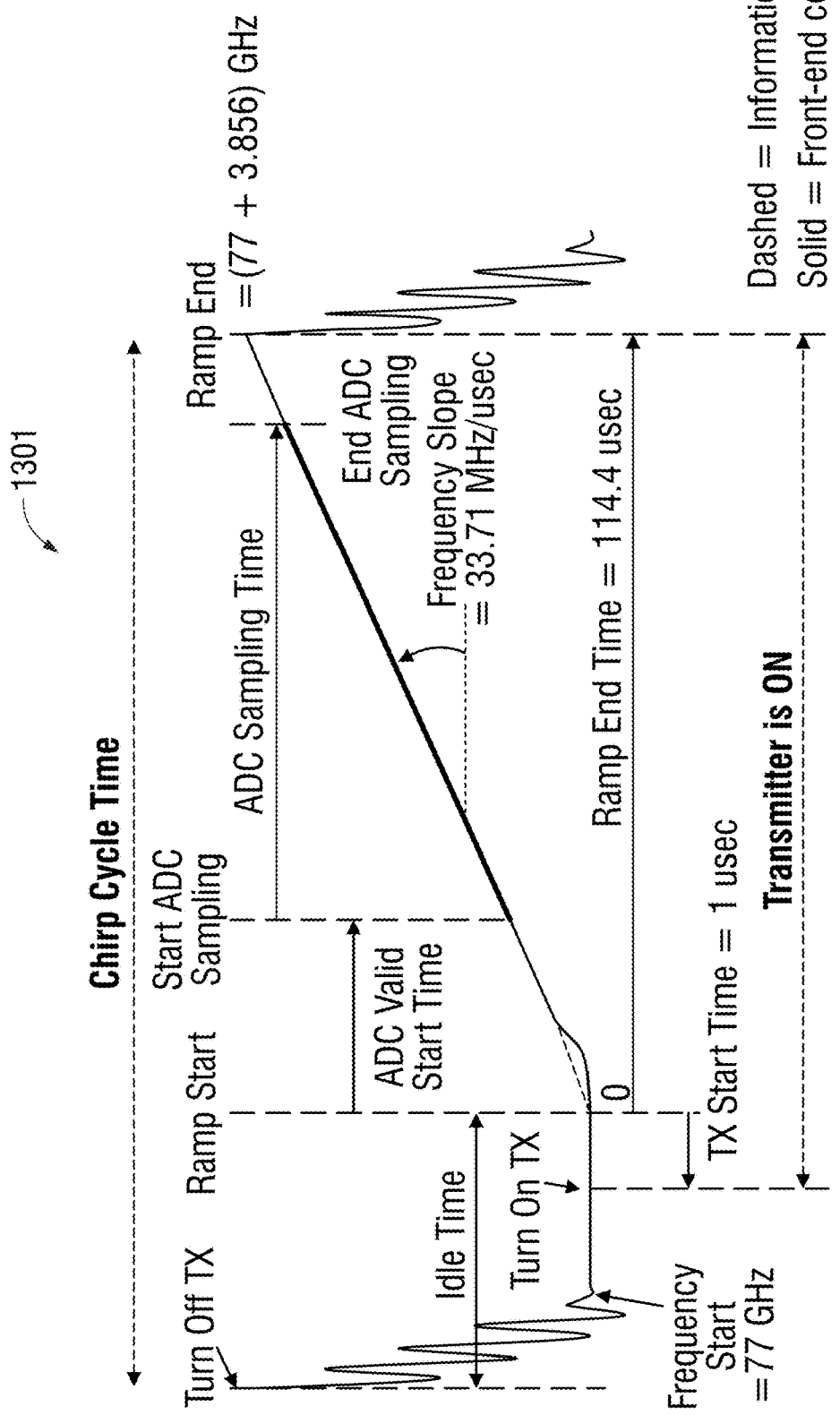
Figure 14A:
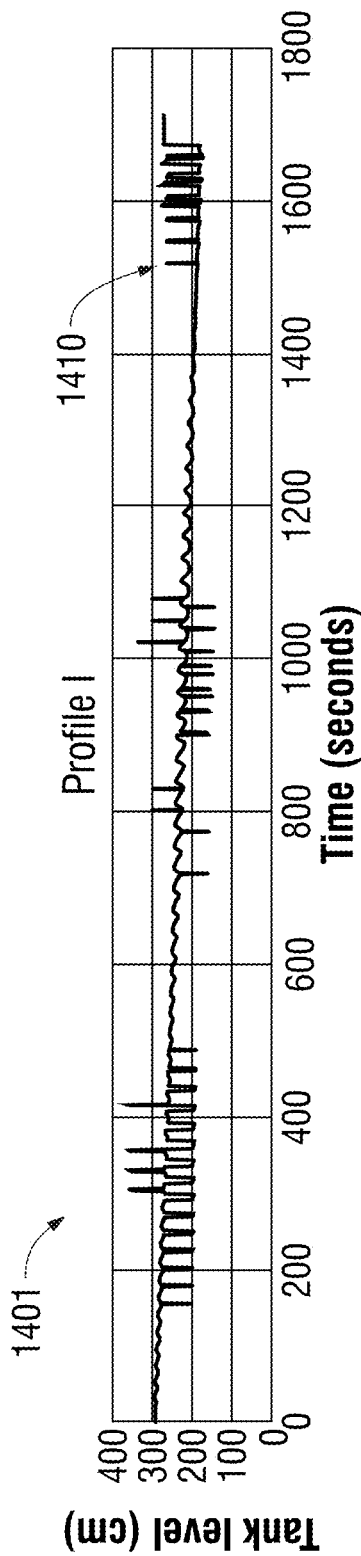
Figure 14B:
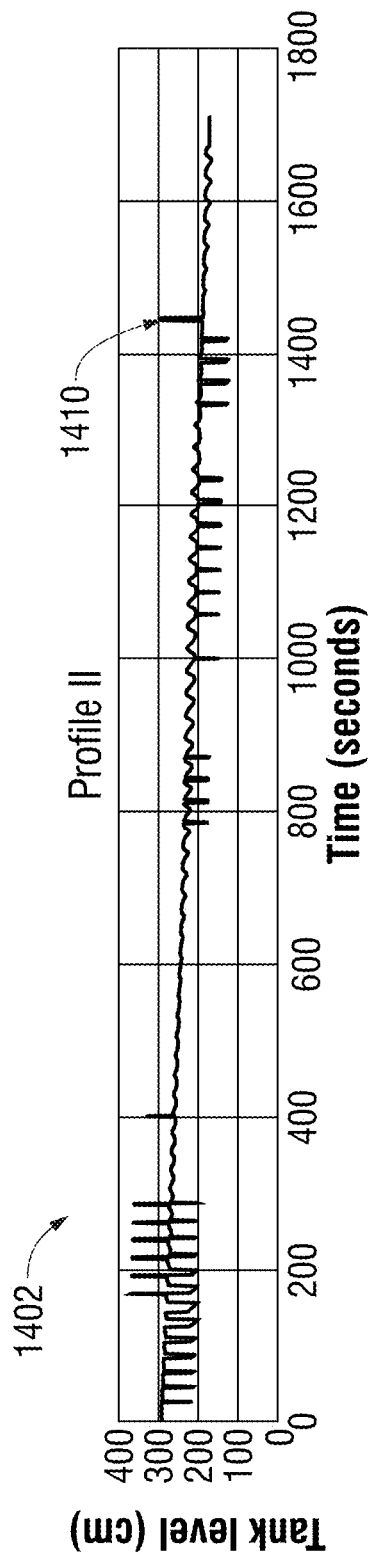

FIG. 13A show an example of the radar chirp signal at 1301. The radar generates this exemplary chirp signal to determine fluid level in the tank. Measuring fluid level in a tank using mmWave is challenging because there are many reflections and multiple paths of the signal between the tank walls. Reflections and excess noise due to high amplification can cause erroneous readings of the fluid level. Embodiments of the tank level monitor 100 uses various methods to improve the accuracy of the tank level and volume readings.

FIG. 13B shows a list of different configuration profile parameters used by the mmWave radar module 309, specifically the AWR1642 radar chip. These parameters are stored in nonvolatile memory in the AWR1642 chip and include the gain, number of chirps, timers, number of samples, and chirp frequencies. The high and low pass filters can be changed by the user within the AWR1642 radar chip. In most instances, there is no single set of operational parameters that suits all fluids and fluid levels. Accordingly, in some embodiments, an approach of using three or more profiles 1304 to generate chirps in rapid succession and selecting the best outcome provided an excellent method of obtaining good measurement results. Some of the chirp parameters that can be changed are shown at 1303. The software in the AWR1642 radar chip can automatically generate chirps using three configuration profiles in very rapid succession and collects data on each resulting response. Data is analyzed automatically as described previously in FIG. 4 to return the correct fluid level to the user.

FIGS. 14A-14D show performance data associated with different chirp configuration profiles. The data shows the performance of the radar module as used to measure fluid level while draining a tank a few inches. The tank depth readings in these figures show that, although not required, it is beneficial to run multiple different chirp profiles. Three different chirp configuration profiles I, II, and III were used in this example, as shown in graphs 1401, 1402, 1403 in FIGS. 14A-14C. Each chirp configuration profile resulted in sporadic high and low spikes 1410 in the measurements. These sporadic spikes 1410 are due to multi-path reflections and noise in the radar system that result in large measurement errors. As can be seen in graphs 1401, 1402, 1403, the radar module 309 produced different measurement curves using the three different configuration profiles. This demonstrates that a single chirp configuration profile will not produce good measurement results given an unknown fluid level. Running different configuration profiles and selecting the best results as described herein provides a more accurate way to determine the correct fluid level. Radar module 309 can automatically use three different profile-configurations using processor 337 and can gather the resulting tank level measurements. Three responses are obtained, each representing a different configuration profile, and each containing 10 sets of distances and signal strength measurements:

Res 1: [RANGE 1st, POWER 1st] [RANGE 2nd, POWER 2nd] . . . [RANGE 10th, POWER 10th]

Res 2: [RANGE 1st, POWER 1st] [RANGE 2nd, POWER 2nd] . . . [RANGE 10th, POWER 10th]

Res 3: [RANGE 1st, POWER 1st] [RANGE 2nd, POWER 2nd] . . . [RANGE 10th, POWER 10th]

Then, two of the three responses from above that have the strongest signal strengths are then averaged to create a set of 10 best distance and signal readings, as shown at 1404 in FIG. 14D. As mentioned earlier, this may include, for example, [RANGE 1st, POWER 1st] from profiles 1 and 2, [RANGE 2nd, POWER 2nd] from profiles 2 and 3, [RANGE 10th, POWER 10th] from profiles 1 and 3, and so on. As this figure show, merging the chirp responses (by ignoring depth level readings that vary greatly from their counterparts) shows that running multiple chirp profiles can produce highly accurate results.

In general, individual configuration profiles typically have an error of about 5-10%. The three-configuration profile approach herein can produce results with an accuracy of within 0.5 percent, as seen in graph 1404. And the radar module 309 can perform all of this in about 0.5 seconds. The set of range/distance and signal power readings is then sent to controller 302 to determine the most likely correct level using the process described with respect to FIGS. 4A-14C. A single fluid depth and gallons are then sent to the user on display 318 and telemetry modules 306 or 307.

FIG. 15 shows exemplary messages that may be displayed to the user on display 318 or sent off-site via the telemetry modules 306 or 307. These messages include system status messages, examples of which are listed at 1501, as well as system error messages, examples of which are listed at 1502. These messages provide users with useful information about the tank level monitor 100. Those having ordinary skill in the art will understand that other status and error messages besides the ones shown here may also be used.

Figure 16:
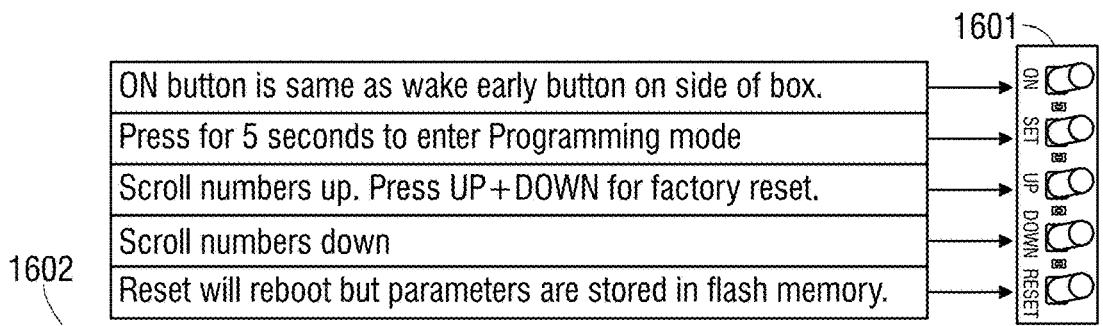
FIG. 16 shows an exemplary keypad and commands for an exemplary tank level monitor according to an embodiment of this disclosure.

FIG. 16 shows an exemplary keypad 1601 (also see FIG. 3 at 319) that may be used in some embodiments to program operation of the tank level monitor 100. The programmability of the tank level monitor 100 allows it to be used in many diverse situations on different chemicals. An exemplary list of programming messages is shown at 1602 (along with information about the parameters). These messages 1602 may be displayed to the user via the display 103 to assist the user in programming the tank level monitor 100.

Figure 17A:
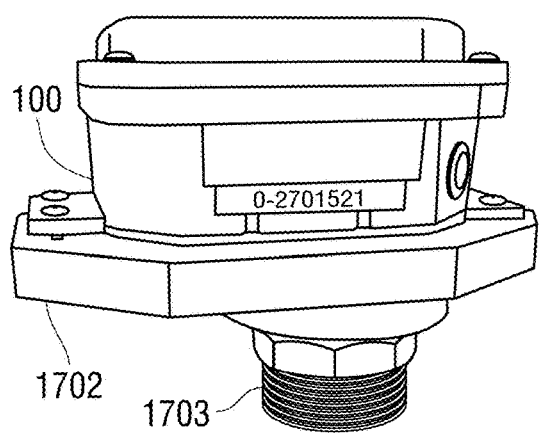
FIGS. 17A-17C are exterior views showing an exemplary tank level monitor mounted on a tank according to an embodiment of this disclosure.
Figure 17B:
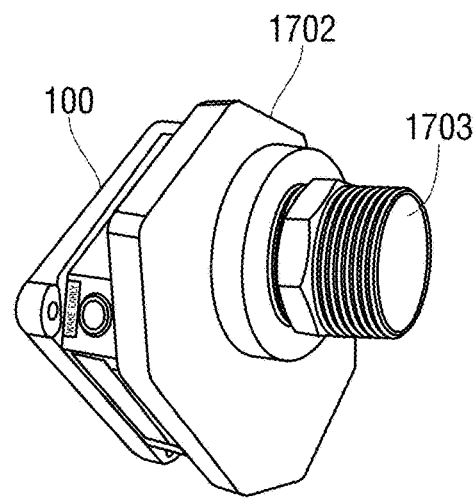
Figure 17C:
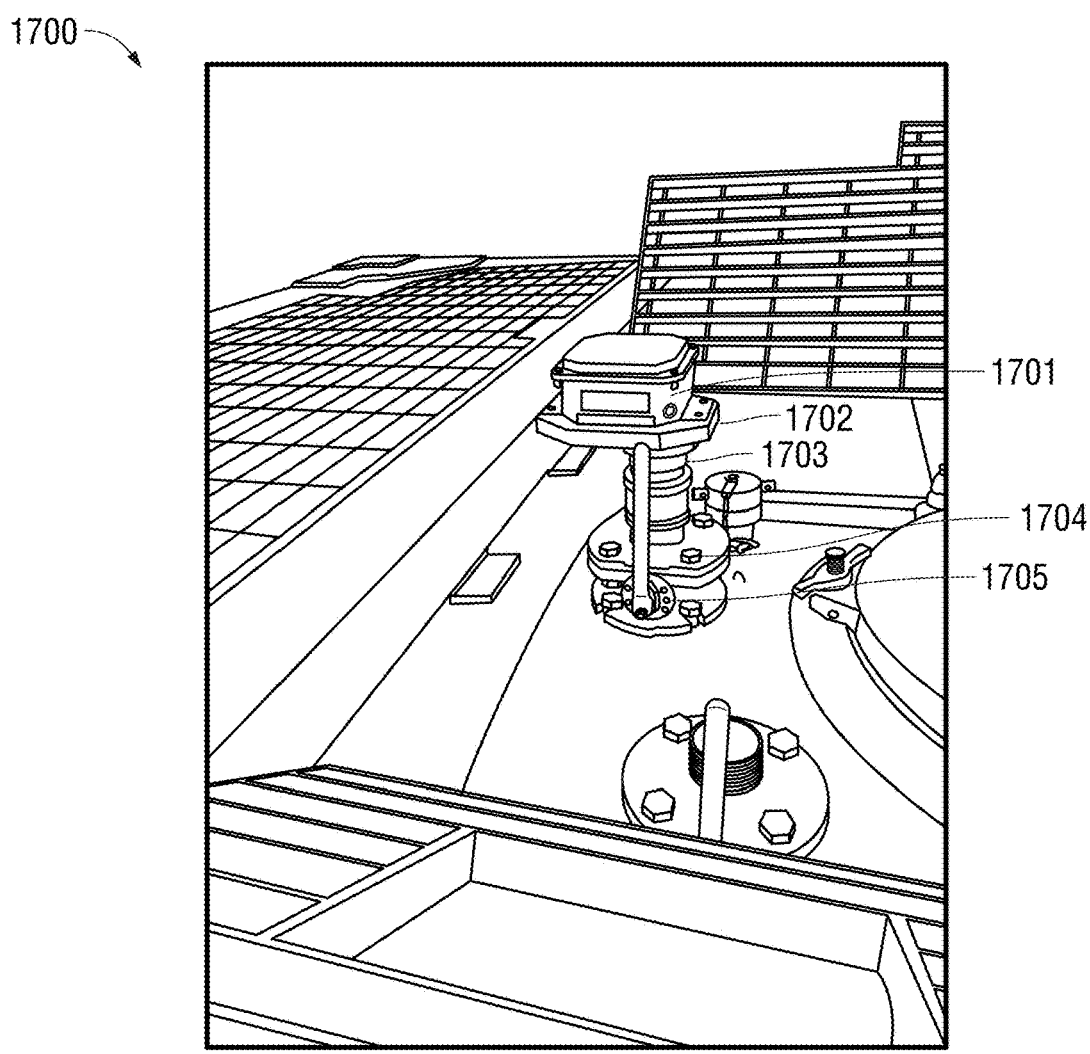
Figure 18C:
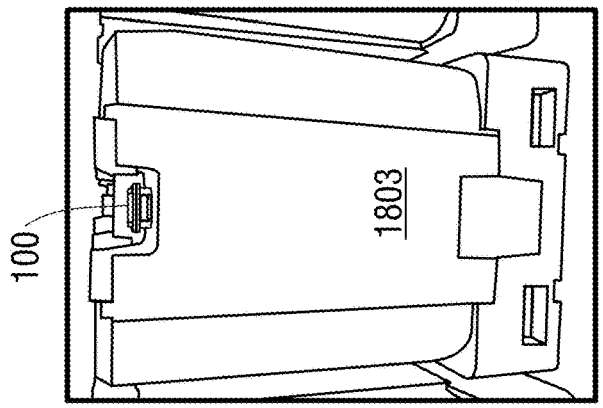
FIGS. 18A-18E are additional exterior views showing an exemplary tank level monitor mounted on tanks according to an embodiment of this disclosure.
Figure 18B:
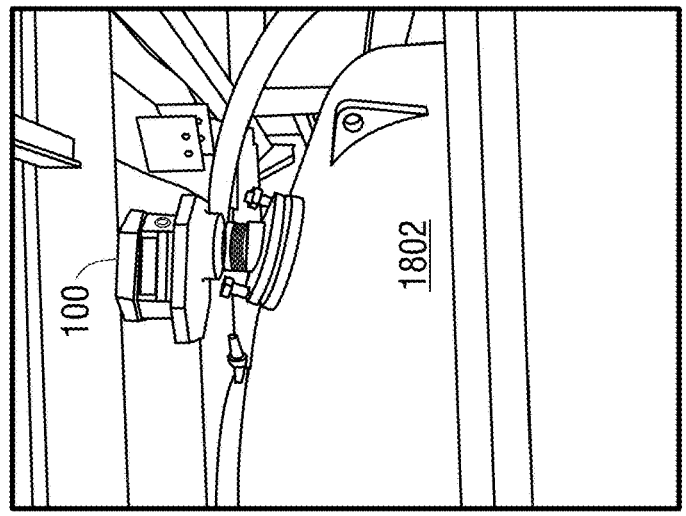
Figure 18A:
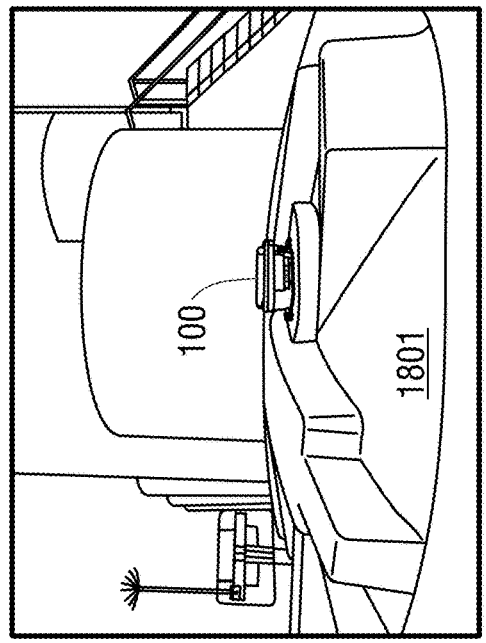
Figure 18D:
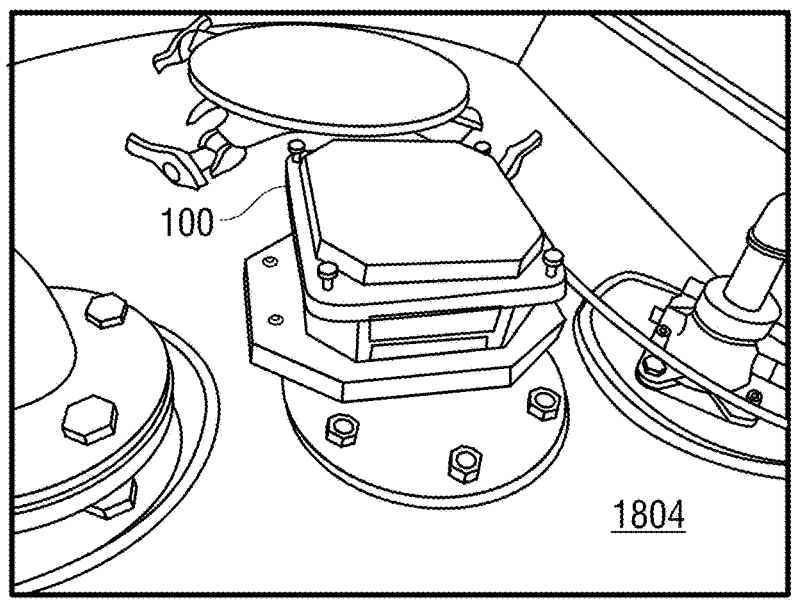
Figure 18E:
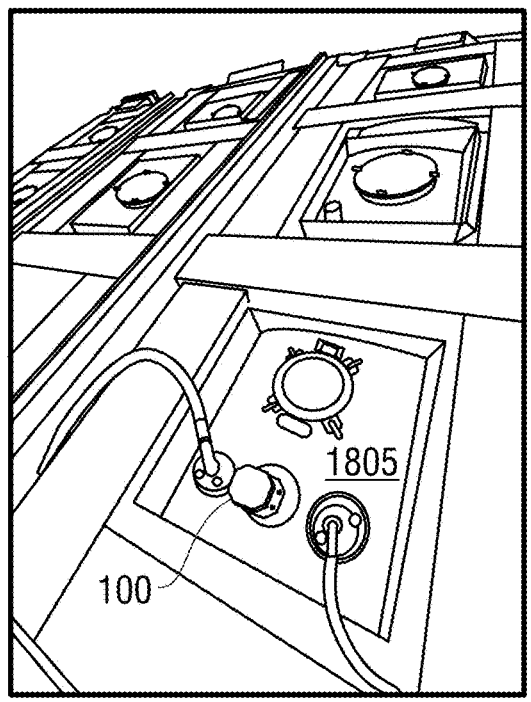
Figure 19A:
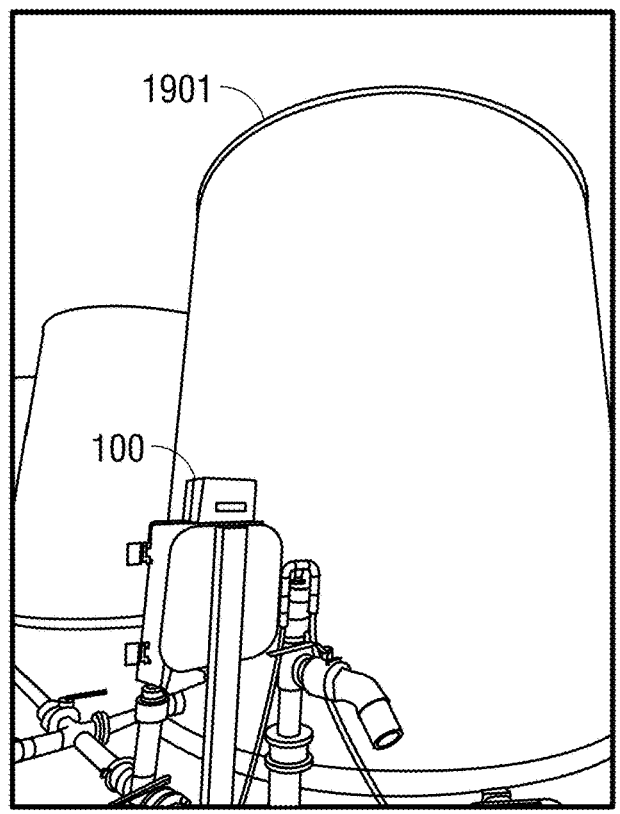
FIGS. 19A-19D are still additional exterior views showing an exemplary tank level monitor mounted on tanks according to an embodiment of this disclosure.
Figure 19B:
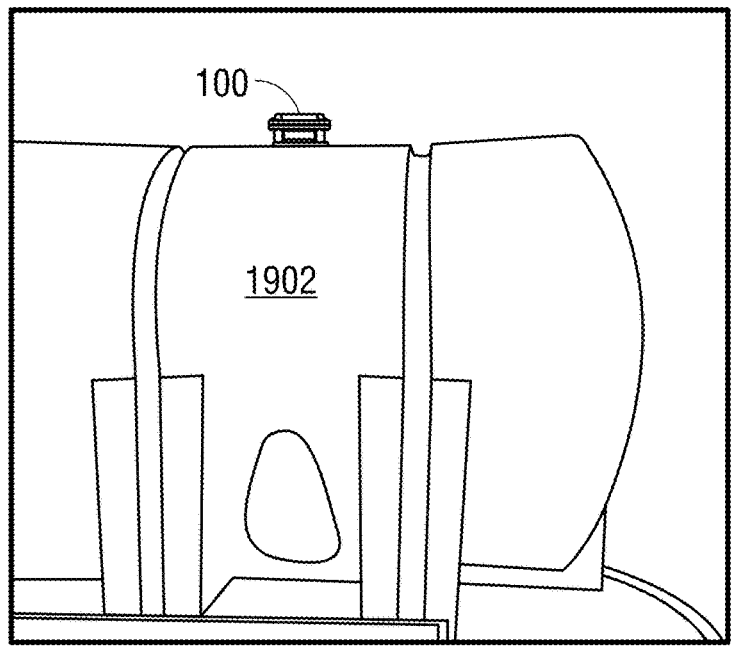
Figure 19C:
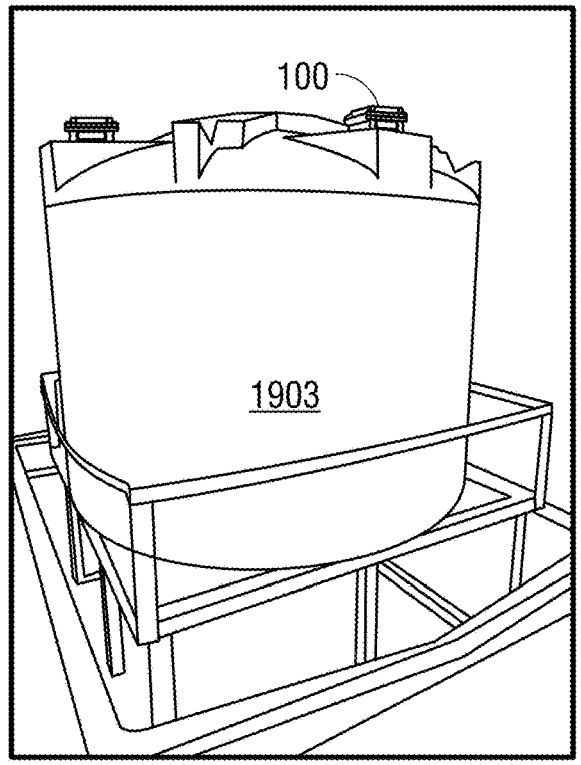
Figure 19D:
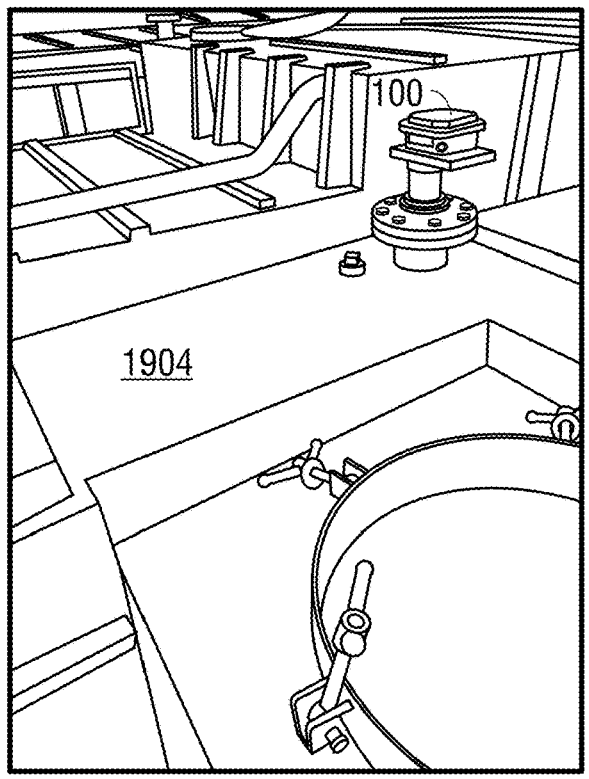

FIGS. 17A-17B show different views of the tank level monitor 100 in isolation and FIG. 17C shows a view of the tank level monitor 100 as installed on top of a tank. As discussed previously, the tank level monitor 100 can used on virtually any type of tank. The typical installation is where the monitor 100 is placed on top of a plastic tank 101 and the radar signals can "see" through the plastic tank wall. Installation on metal tanks is also possible by using a special adapter to mount to one of the tank flanges, as shown in FIGS. 17A and 17B. An ISO tank with a typical 2-inch NPT fitting is shown at 1700 in FIG. 17C. In FIGS. 17A and 17B, a nipple 1703 screws into a tank flange 1705. Teflon plate 1702 screws onto nipple 1703 and the tank level monitor 100 is attached to the plate 1702 so that the radar beam is centered over the 2-inch nipple. The Teflon plate has a low dielectric constant, so the radar beam easily passes through it while it inherently protects the radar from the caustic fluid and seals the tank. Shut-off valve 1704 keeps fluid from leaking in case there is a major accident and the tank rolls over during transportation and breaks plate 1702 from nipple 1703. Many other mounting techniques are available within the scope of the disclosed embodiments.

FIG. 18A-18E are views of the tank level monitor 100 mounted on several different types of tanks. The tank level monitor 100, with its adaptive algorithms and sophisticated filtering and depth discernment, can be adapted to many types of tanks. Adapter 1702 from the previous figures can be used for mounting and to access fluid on larger tanks. Smaller ISO tanks 1803, as well as larger poly tanks 1801, metal ISO Tanks 1802, ISO tanks 1804, tanks 1805 of the type used in tank farms.

FIG. 19A-19D are views of the tank level monitor 100 mounted on taller chemical tanks 1901 where the tank level monitor 100 can sit unseen at the top of the tank and transmit level readings by satellite, smartphone or locally to the monitor's remote display. The tank level monitor 100 can also be mounted on the taller poly tanks 1902, 1903, as well as frac tanks 1904.

Figure 20:
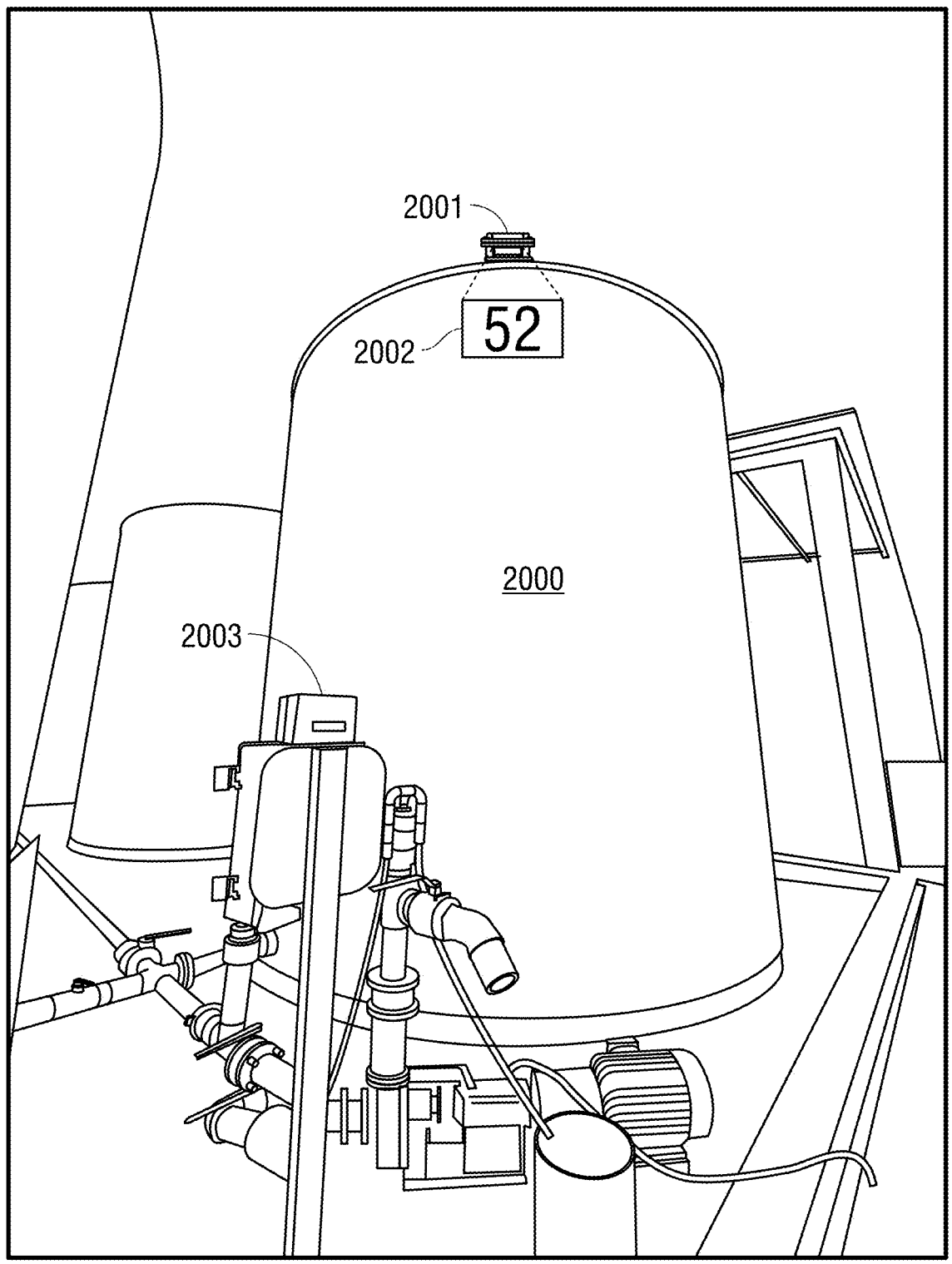
FIG. 20 is an exterior view showing an overhead display for an exemplary tank level monitor mounted on tanks according to an embodiment of this disclosure.

FIG. 20 shows an embodiment where the tank level monitor 100 (not expressly seen) is used to send fluid level readings for a tank 2000 to an overhead display 2001. A close-up view of the overhead display is shown at 2002. Looking at an overhead display 2002 is faster than accessing data online or via a smartphone and is particularly helpful when taking tank level inventories from a moving vehicle, such as a pickup truck, or when an operator is walking through the tank yard. The tank level monitor 100 sits on top of the tank 2000 and takes measurements of the fluid level, then transmits data to an overhead display 2002, such as an LCD display. The LCD display 2002 is preferably a type that continually displays the data sent to the display and is only updated when new data is received from the tank level monitor 100. Back lighting turns on so the LCD display 2002 can be seen at night. The LCD uses very low current for battery power. In some embodiments, a separate remote display 2003 can be used to get the current level detailed readings in the tank.

FIGS. 21A-21B show examples of the tank level monitor 100 communicating with a remote display 2101 or a smartphone 2111 using Bluetooth. Remote display 2101 is positioned at the base of a tall tank, such as the one shown at 2000 (FIG. 20). The operator can then press button 2102 on the remote display 2101 to get the current level within seconds. When the button is pressed, a BLE low power Bluetooth module on the remote display 2101 communicates with and wakes up the tank level monitor 100. Having a Bluetooth module in the tank level monitor 100 creates a private wireless serial connection with the smartphone 2111 or remote display 2101 when a device requests a connection. When sleeping, the monitor 100 advertises its identity using BLE to interrogate whether a smartphone or remote display wants to communicate. Monitor 100 takes readings and updates local display 2104 as well as sends data to the user at the base of the tank on display 2101. Alternatively, smartphone 2111 can display the current tank status as well as be used to program the tank level monitor 100. A suitable smartphone app can use the Bluetooth capability of each monitor 100 to allow the user to select a specific monitor 100 and create a private communication link to that monitor 100. Any one of many monitor 100 nearby (within Bluetooth range) can be accessed using a smartphone. This same Bluetooth capability allows the remote display or smartphone to access data and wake the monitor from sleep without touching the monitor 100.

Figure 23A:
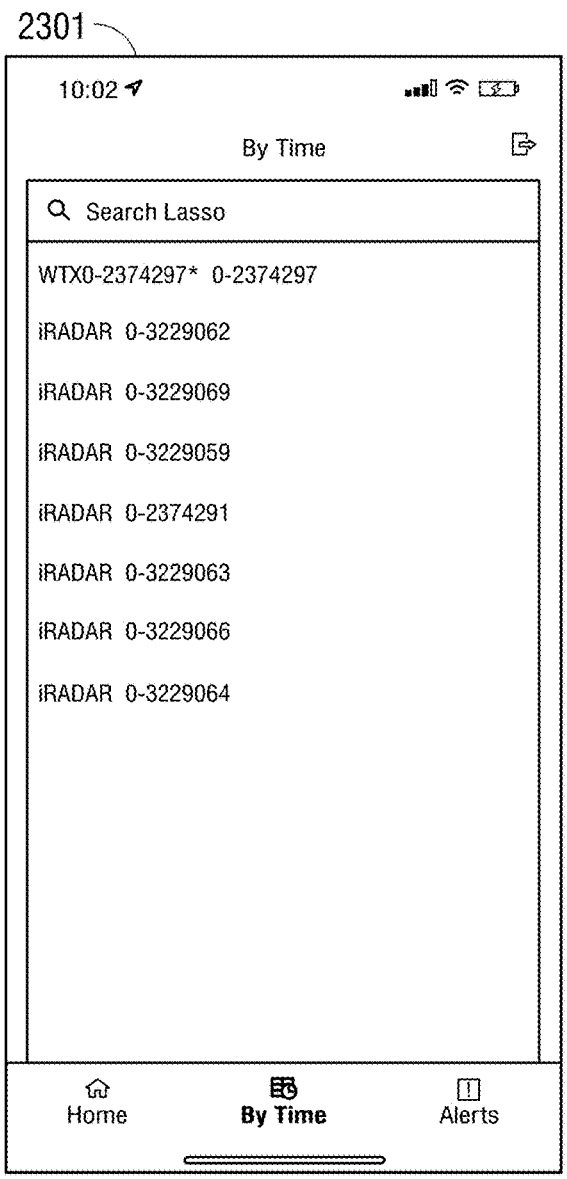
FIGS. 23A-23B are exemplary smartphone screens for monitoring multiple exemplary tank level monitors according to an embodiment of this disclosure.
Figure 23B:
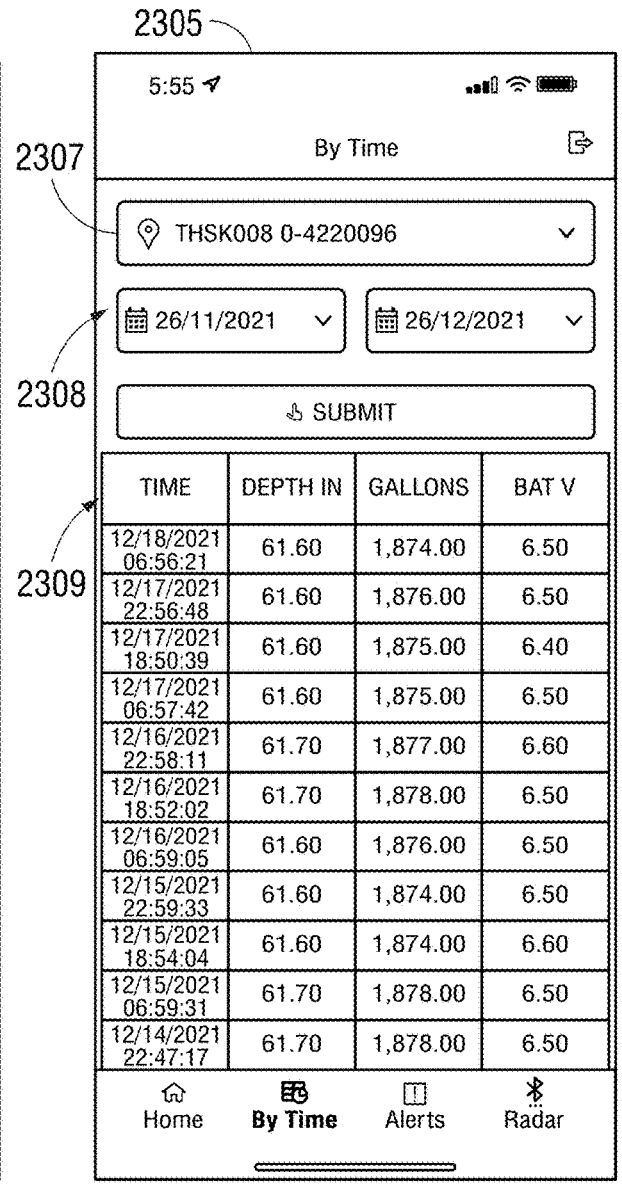

FIGS. 22A-22C show examples of screens that may be displayed on an iPhone or Android app for the tank level monitor 100. The exemplary smartphone screen 2201 in FIG. 22A shows all the various monitors 100 that belong to a particular login or customer. The exemplary smartphone screen 2202 in FIG. 22B shows the location of all monitors 100 on a map. The exemplary smartphone screen 2203 in FIG. 22C shows driving instructions that can guide the user to the site. The screens leverage the existing GPS location and navigation capability equipped in most Smartphones FIGS. 23A-23B show examples of screens that may be displayed on a smartphone to allow a user to select which of several monitors to evaluate. An additional feature is the ability for the user to touch any of the serial numbers 2201 on the smartphone to initiate a wake-up sequence for that particular monitor 100 over Bluetooth. Within seconds of doing so, the monitor 100 wakes (if sleeping) and accepts a private connection (i.e., via a handshake) between the smartphone and that monitor, a tank reading is taken, and the monitor 100 sends data to the smartphone showing tank level, battery level, any error messages, distance to fluid, and signal strength data (see FIG. 24A at 2401). The exemplary smartphone screen 2301 in FIG. 23A shows all the various monitors 100 that belong to a particular login or customer account. Once the monitor is selected as shown in smartphone screen 2305 (e.g., by using drop down menu 2307), the user can select the date range of interest at fields 2308 and see all depth readings taken during the selected date range at 2309.

Figures 24A, 24B:
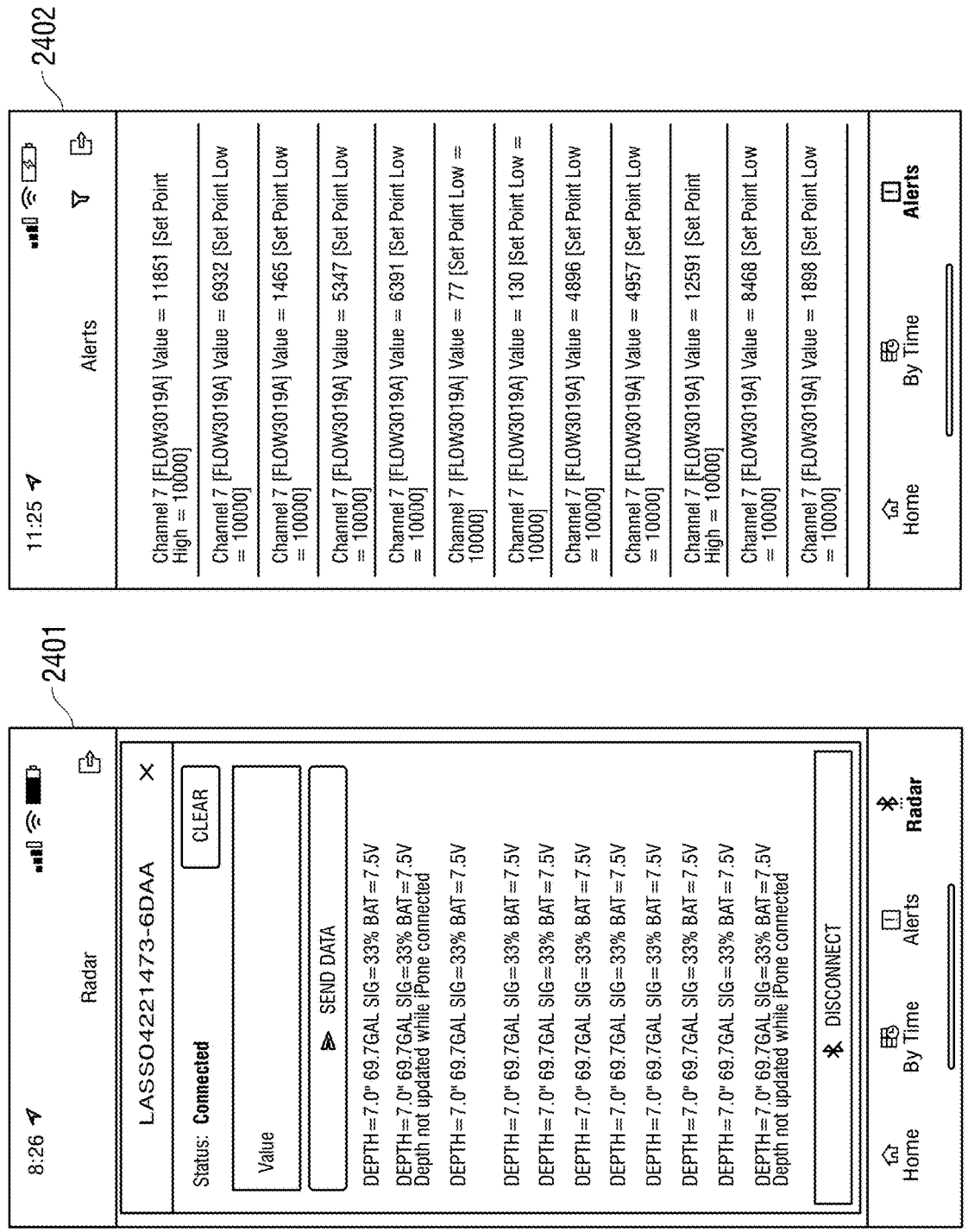
FIGS. 24A-24B are exemplary smartphone screens for reviewing past tank level volume readings for an exemplary tank level monitor according to an embodiment of this disclosure.

FIGS. 24A-24B show examples of screens that may be displayed on a smartphone to allow a user to directly communicate with a selected monitor 100. The exemplary smartphone screen 2401 in FIG. 24A shows a smartphone app that uses Bluetooth to allow the user to directly communicate with a selected monitor 100 and see all current depth readings taken by the monitor 100. The exemplary smartphone screen 2402 in FIG. 24B shows a smartphone app that allows the user to access and see any alarms that may have occurred at a selected monitor 100.

Figure 25:
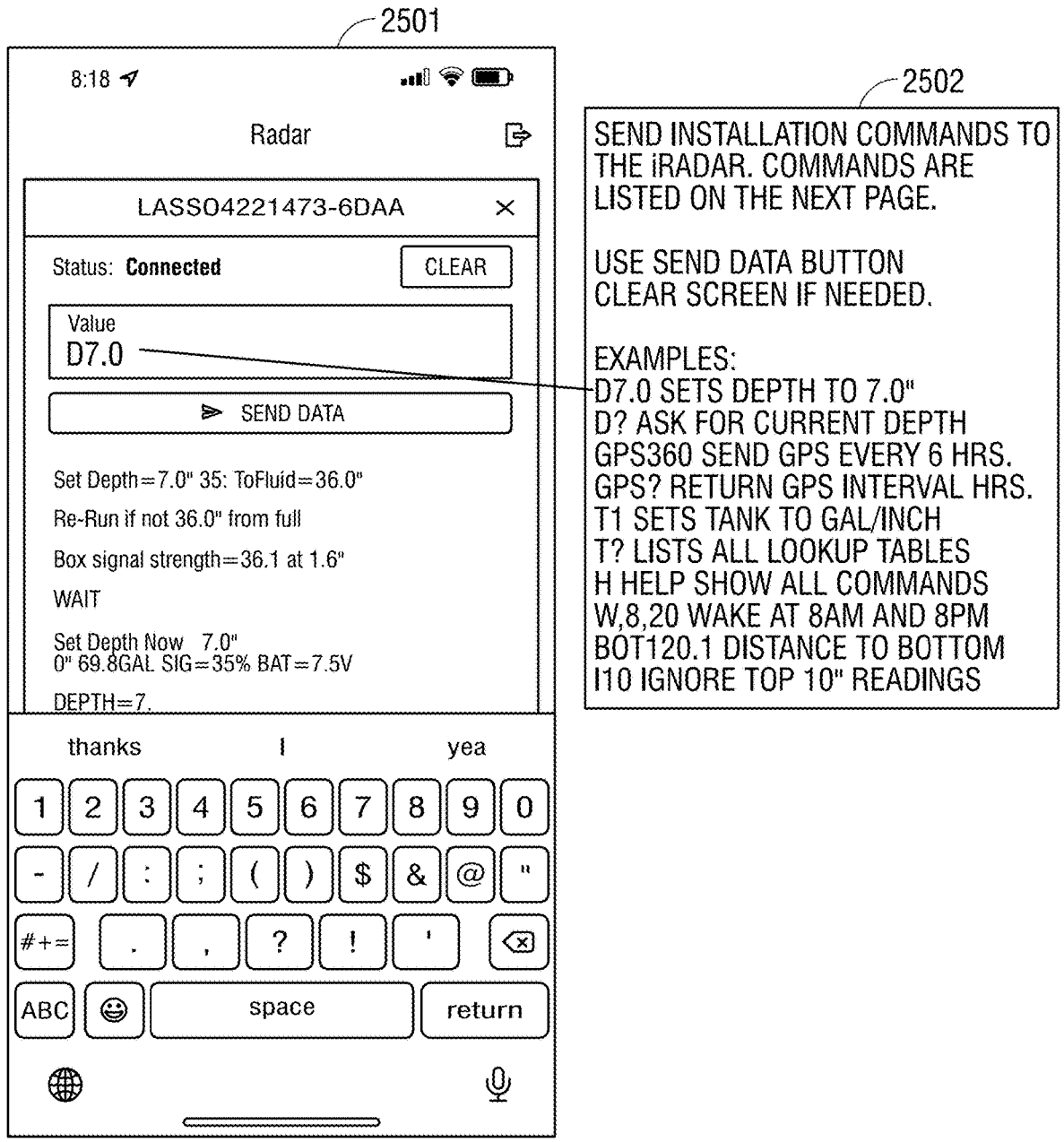
FIG. 25 is an exemplary smartphone screen for issuing simple text commands to an exemplary tank level monitor according to an embodiment of this disclosure.

FIG. 25 shows an example of a screen that may be displayed on a smartphone to allow the user to communicate with a selected monitor 100 using simple text messages. The exemplary smartphone screen 2501 in FIG. 25 shows a smartphone app that uses Bluetooth to allow the user to send simple text messages to the selected monitor 100. The controller 302 in the monitor 100 receives the text messages via the Bluetooth module 303 and extracts the text information therefrom. Programming within the monitor 100 processes the extracted text information and modifies the appropriate operational parameters stored in the controller 302 accordingly. To this end, the text information needs to be in a format that is understandable and recognizable by the controller 302. Examples of text messages that may be sent to the monitor 100 are shown at 2502 and can include parameter values that can be directly downloaded into the monitor from the text messages. Commands may be sent to the monitor 100 from a smartphone via Bluetooth in a similar manner.

FIG. 26 shows examples of commands that a user may send to the monitor 100 via a smartphone to allow the user to control various operations. The exemplary commands, indicated at 2601, allow the monitor 100 to be programmed using the smartphone. In some cases, the user can also use the smartphone to request a current tank parameter, indicated at 2602, for a given tank. The monitor 100 also has tank templates 2603 saved therein for various types of tanks to allow the user to quickly configure the tank for customer's monitor. The tank templates include various attributes about the tanks that the user may fill in via the smartphone. These attributes may include a lookup strapping chart for the customer's tank, radar power needed for the tank, tuning settings for the tank, distance at top of tank (to ignore for reading purposes), tank height, other tank dimensions, time of day call-in times, GPS update times, and even GMT time offset in some cases. The tank and radar settings and other information may be stored on the smartphone in some embodiments, or the information may be stored on the monitor 100 in some embodiments, or a combination of both. In embodiments where the tank templates and information are already preloaded on the monitor 100 (which is normally the case), a customer may simply send a command like "T12" (see 2603) to automatically configure a particular tank. This speeds installation of the monitor 100 on the tank, particularly when all tanks in a large tank yard are identical, so manual tuning of the monitor is not required.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled.

What is claimed is:

1. A tank level monitor for measuring a distance from near a top of a tank to one or more fluids in the tank, comprising:
   a chirp generator configured to generate a millimeter wave chirp that ramps linearly from a starting frequency to a predefined higher frequency within a specified time span;
   an antenna and quadrature hybrid circuit configured to transmit the chirp generated by the chirp generator into the tank and to receive one or more chirp reflections from the tank;
   a Luneburg lens coupled to the antenna and quadrature hybrid circuit, the antenna and quadrature hybrid circuit configured to transmit the chirp and receive the chirp reflections through the Luneburg lens;
   a mixer configured to mix the chirp with the chirp reflections to generate one or more intermediate frequency signals;
   a processor configured to process the one or more intermediate frequency signals and derive signal strengths and distances from the one or more intermediate frequency signals, each distance indicative of a distance from near a top of the tank to one of the one or more fluids in the tank or an obstruction in the tank; and
   a controller configured to automatically select intermediate frequency signals having signal strengths above a predefined minimum or distances within a predefined distance window for further processing and ignore other intermediate frequency signals and distances.

2. The tank level monitor according to claim 1, wherein the controller is programmed to automatically select an intermediate frequency signal for further processing, the intermediate frequency signal representing a best returned signal for further processing.

3. The tank level monitor according to claim 2, wherein the controller is programmed to automatically further process the selected intermediate frequency signal by adding the selected intermediate frequency signal to a ballot, the ballot including previously selected intermediate frequency signals, the controller further programmed to automatically vote on the intermediate frequency signals on the ballot.

4. The tank level monitor according to claim 1, wherein the controller is programmed to automatically use distance windows to ignore distances indicative of obstructions in the tank.

5. The tank level monitor according to claim 1, wherein the controller is programmed to automatically focus on specific distance windows indicative of fluids in the tank.

6. The tank level monitor according to claim 1, wherein the processor is configured to process the one or more intermediate frequency signals using zoom Fourier transform.

7. The tank level monitor according to claim 1, further comprising a telemetry unit configured to transmit distance readings to an off-site location.

8. The tank level monitor according to claim 7, wherein the telemetry unit is configured to use one of the following wireless telemetry technologies: cellular, satellite, Bluetooth, Wi-Fi, Z-Wave, ZigBee, WiMax, Sigbox, LoRa, Ingenu.

9. The tank level monitor according to claim 1, wherein the chirp generator generates a chirp according to a preselected chirp configuration profile, and wherein the chirp generator is configured to use three chirp profiles for a given tank level and volume reading.

10. The tank level monitor according to claim 1, further comprising a wake button that allows a user to wake the tank level monitor, the tank level monitor configured to obtain a tank level and volume reading and to show the reading upon being woken.

11. The tank level monitor according to claim 1 wherein the tank level monitor automatically wakes as needed to obtain a GPS location, obtain a tank level reading, and send data representing the GPS location and the tank level reading wirelessly to an off-site location.

12. The tank level monitor according to claim 1, wherein the controller is configured to wake upon receiving a wake command from a smartphone or a remote display via Bluetooth, obtain a tank level reading, and send data representing the tank level reading wirelessly to an off-site location.

13. The tank level monitor according to claim 1, wherein the chirp generator generates more than 30 chirps per frame sample.

14. The tank level monitor according to claim 1, wherein the processor is further configured to apply one or more of the following filters to the intermediate frequency signals: OS-CFAR filter, and Blackman filter.

15. The tank level monitor according to claim 1, wherein the controller is further configured to transmit tank level and volume readings to an external display using Bluetooth.

16. The tank level monitor according to claim 1, wherein the controller is further configured to transmit tank level and volume readings to a smartphone using Bluetooth.

17. The tank level monitor according to claim 1, wherein the controller is further configured to receive commands and tank parameters from a smartphone via Bluetooth.

18. The tank level monitor according to claim 17, wherein the tank level monitor can receive a tank template from the smartphone, the tank template containing setup and configuration parameters for a specific type of tank.

19. The tank level monitor according to claim 1, wherein the controller is further configured to wake up upon receiving a wake-up sequence from a smartphone over Bluetooth, the wake up sequence initiated on the smartphone by a user touching any monitor serial number via a smartphone app running thereon, the controller further configured to obtain and send tank level and other tank data to the user via the smartphone.

20. A method of monitoring tank level for measuring a distance from near a top of a tank to one or more fluids in the tank, comprising:

generating, at a chirp generator, a millimeter wave chirp that ramps linearly from a starting frequency to a predefined higher frequency within a specified time span;

transmitting, through a quadrature hybrid circuit to an antenna, then through a Luneburg lens, the chirp generated by the chirp generator into the tank;

receiving, through the Luneburg lens coupled to the antenna and through the quadrature hybrid circuit, one or more chirp reflections from the tank;

mixing, at a mixer, the chirp with the chirp reflections to generate one or more intermediate frequency signals;

processing, at a processor, the one or more intermediate frequency signals and deriving signal strengths and distances from the one or more intermediate frequency signals, each distance indicative of a distance from near a top of the tank to one of the one or more fluids in the tank or an obstruction in the tank; and automatically selecting, at a controller, intermediate frequency signals having signal strengths above a predefined minimum or distances within a predefined distance window for further processing and ignoring other intermediate frequency signals and distances.

* * * * *